United States Patent
Shimizu et al.

(10) Patent No.: US 8,484,579 B2
(45) Date of Patent: Jul. 9, 2013

(54) INFORMATION PROCESSING APPARATUS AND INFORMATION PROCESSING METHOD

(75) Inventors: Tomoyuki Shimizu, Yokohama (JP); Taeko Yamazaki, Kawasaki (JP); Miho Komiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1024 days.

(21) Appl. No.: 12/049,038

(22) Filed: Mar. 14, 2008

(65) Prior Publication Data
US 2008/0244456 A1   Oct. 2, 2008

(30) Foreign Application Priority Data

Mar. 27, 2007 (JP) ................... 2007-082745
Mar. 27, 2007 (JP) ................... 2007-082746

(51) Int. Cl.
*G06F 3/048* (2006.01)
(52) U.S. Cl.
USPC ................. 715/840; 707/3; 707/100
(58) Field of Classification Search
USPC ................. 715/840; 1/1; 707/3, 100
See application file for complete search history.

(56) References Cited

U.S. PATENT DOCUMENTS

| | | | |
|---|---|---|---|
| 2003/0033296 | A1* | 2/2003 | Rothmuller et al. .............. 707/3 |
| 2004/0177063 | A1* | 9/2004 | Weber et al. ....................... 707/3 |
| 2005/0246352 | A1* | 11/2005 | Moore et al. .................. 707/100 |

FOREIGN PATENT DOCUMENTS

| | | |
|---|---|---|
| JP | 08-083281 A | 3/1996 |
| JP | 09-120409 A | 5/1997 |
| JP | 10-187743 A | 7/1998 |
| JP | 2000-123029 A | 4/2000 |
| JP | 2002-055748 A | 2/2002 |
| JP | 2002-288018 A | 10/2002 |
| JP | 2003-203080 | 1/2003 |
| JP | 2006-113984 A | 4/2006 |
| JP | 2008-537253 A | 9/2008 |

* cited by examiner

*Primary Examiner* — Boris Pesin
*Assistant Examiner* — Elizabeth G Wright
(74) *Attorney, Agent, or Firm* — Canon U.S.A., Inc. IP Divison

(57) ABSTRACT

An information processing apparatus includes an area display unit configured to display a metadata area including metadata values arrayed for each metadata item and unique areas defined for respective metadata values, an icon display unit configured to display an icon associated with main body data and enabling a user to add the metadata, and an adding unit operable if the displayed icon is moved to a position on the metadata area and configured to add information defining a unique area to which the position of the moved icon belongs, as metadata, to main body data associated with the icon.

10 Claims, 33 Drawing Sheets

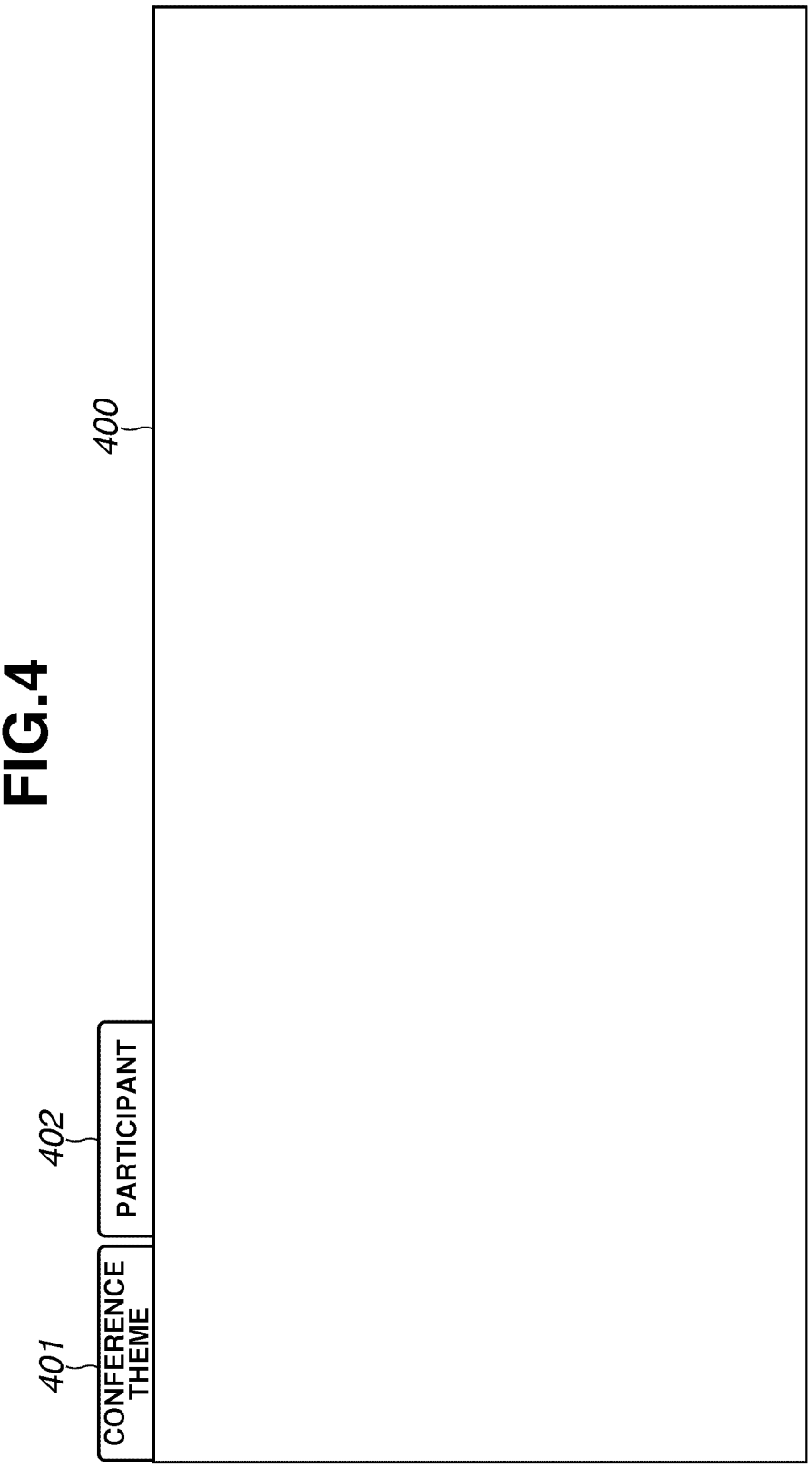

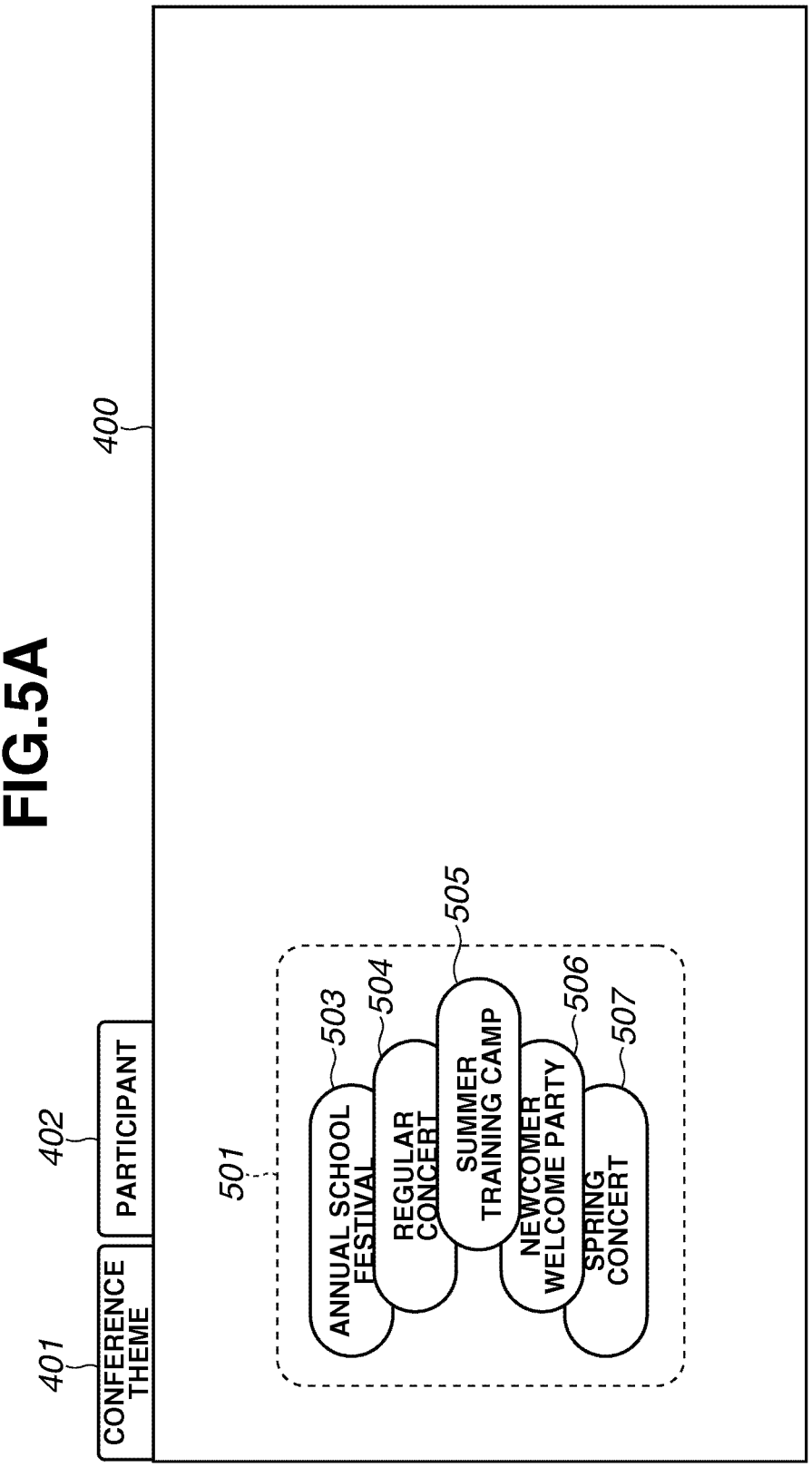

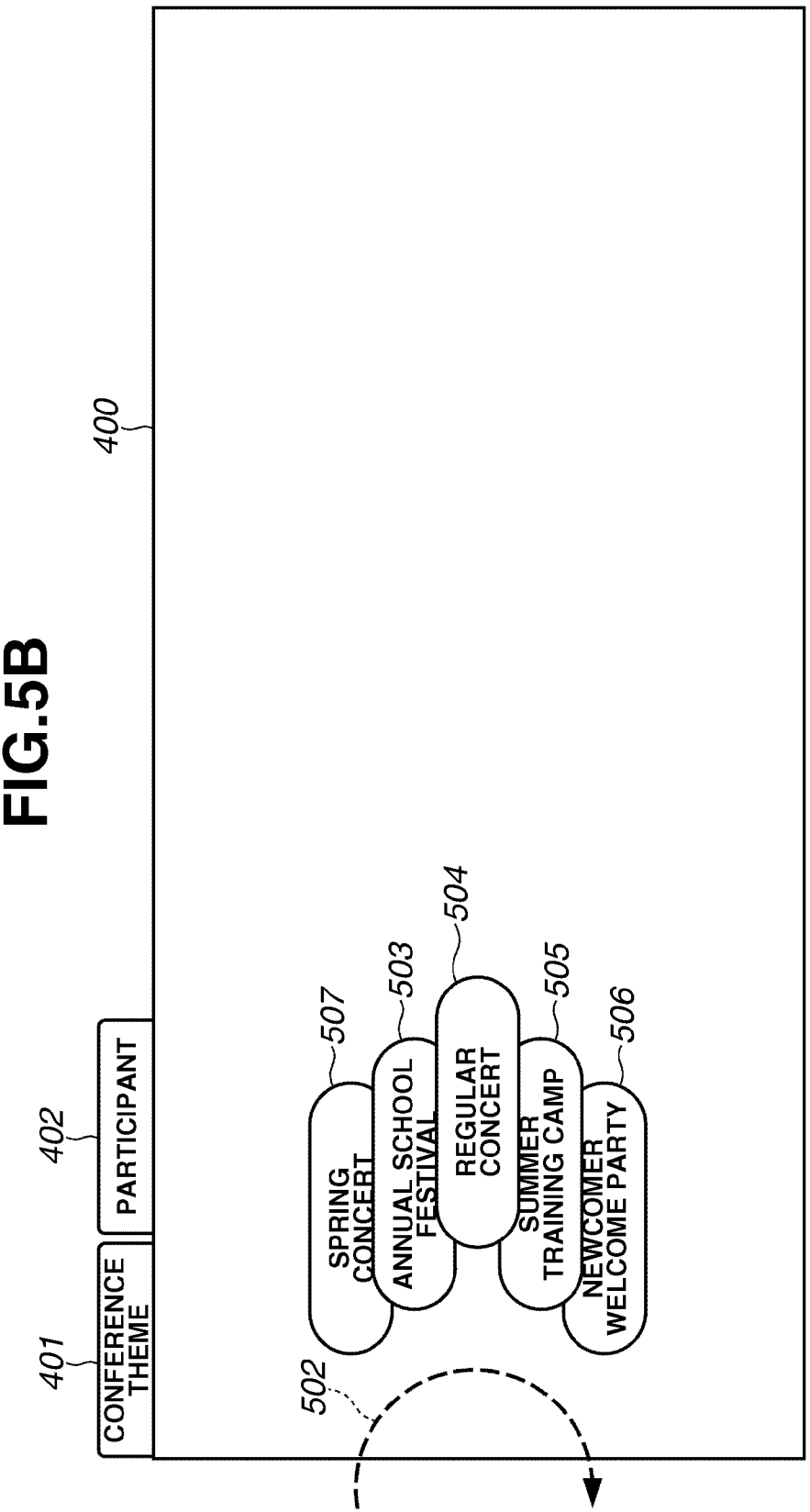

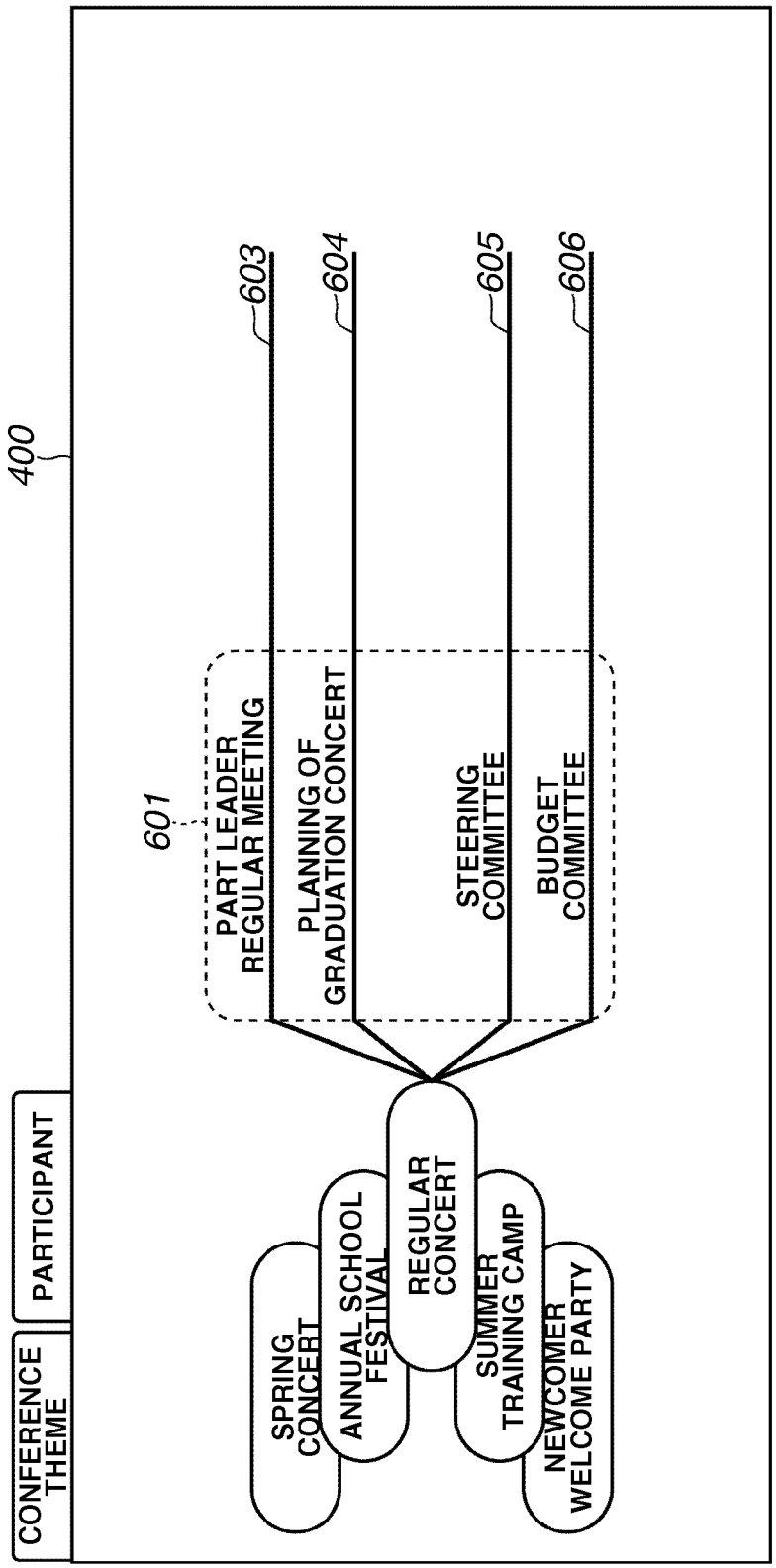

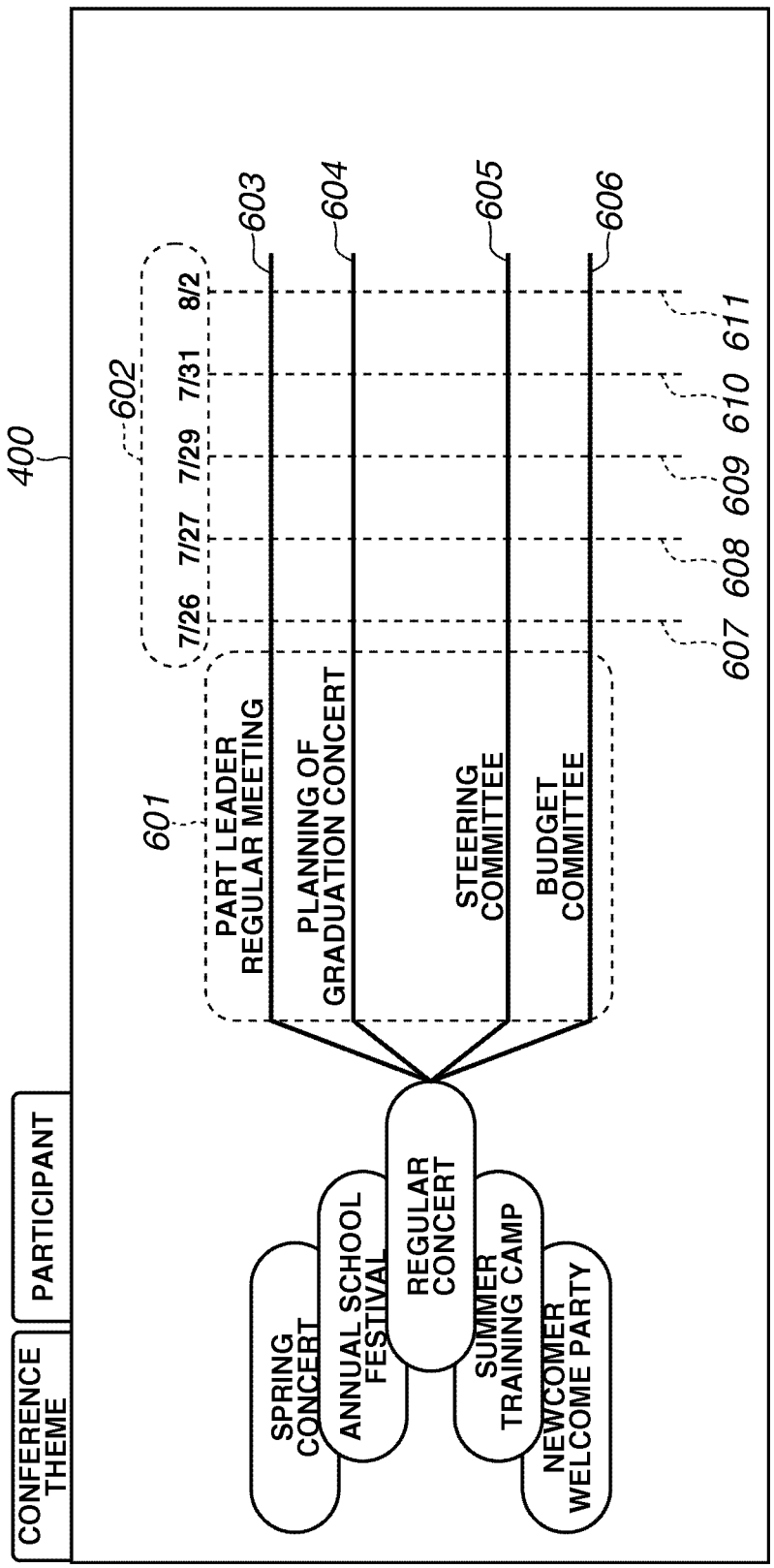

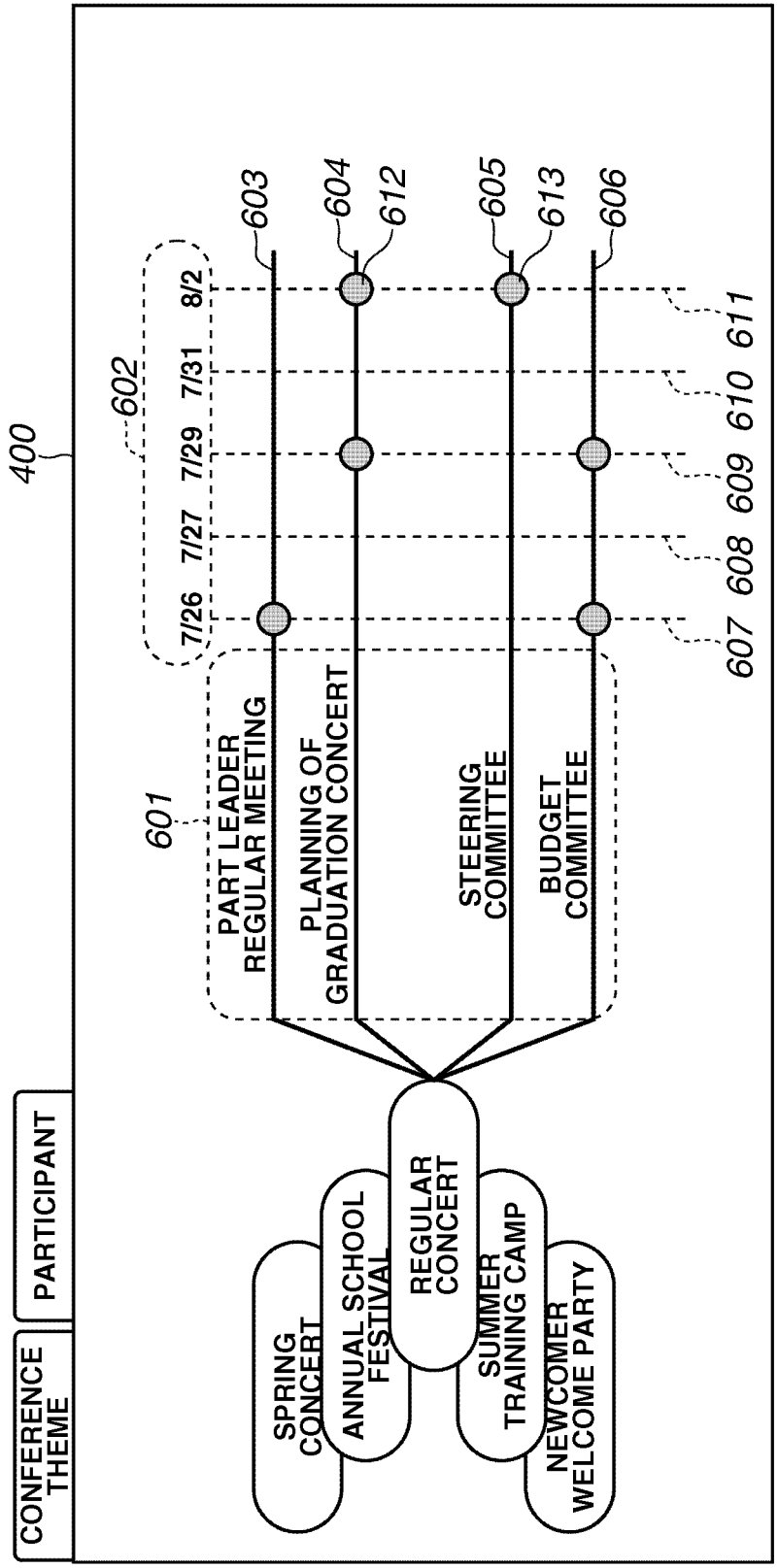

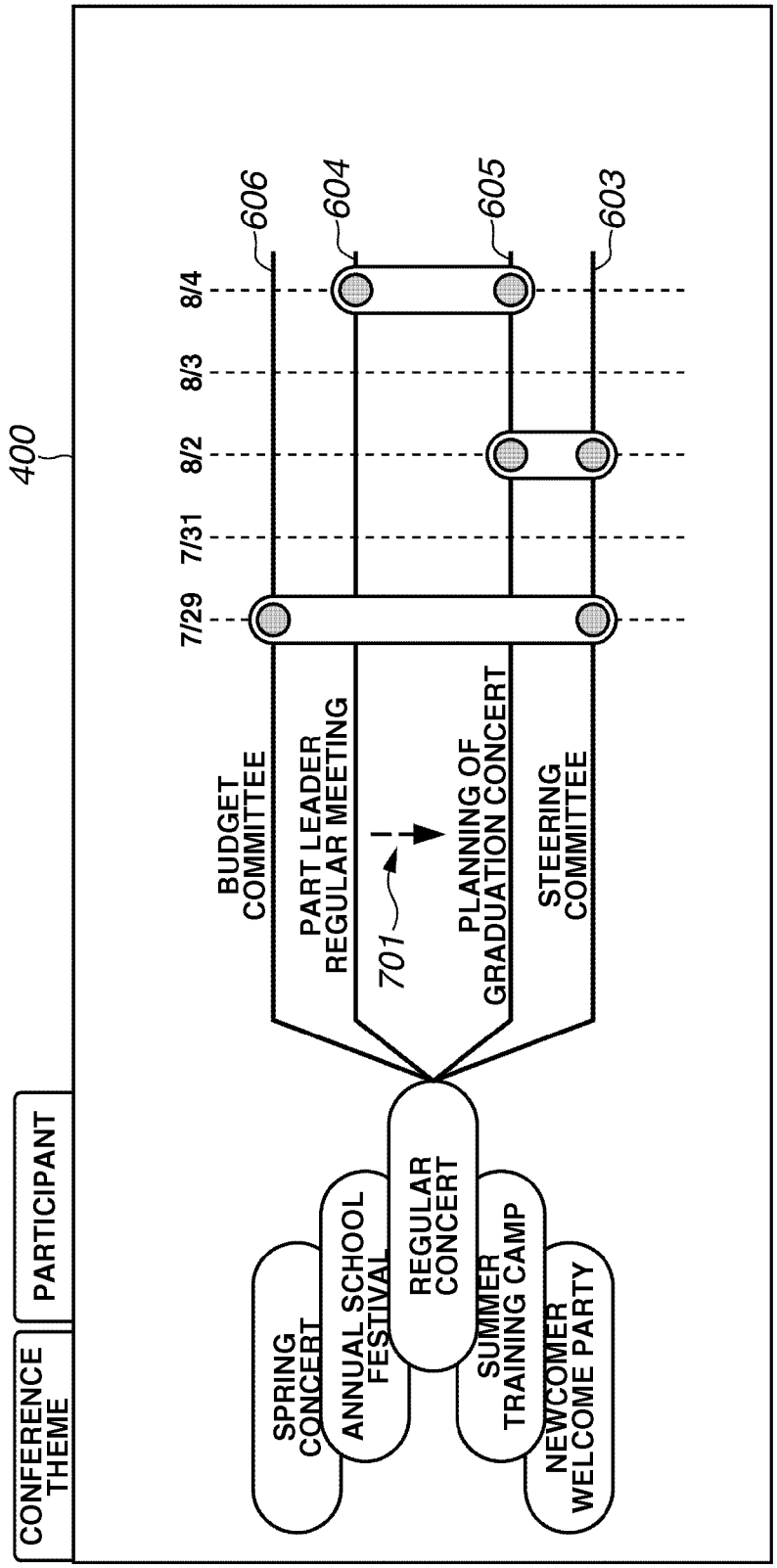

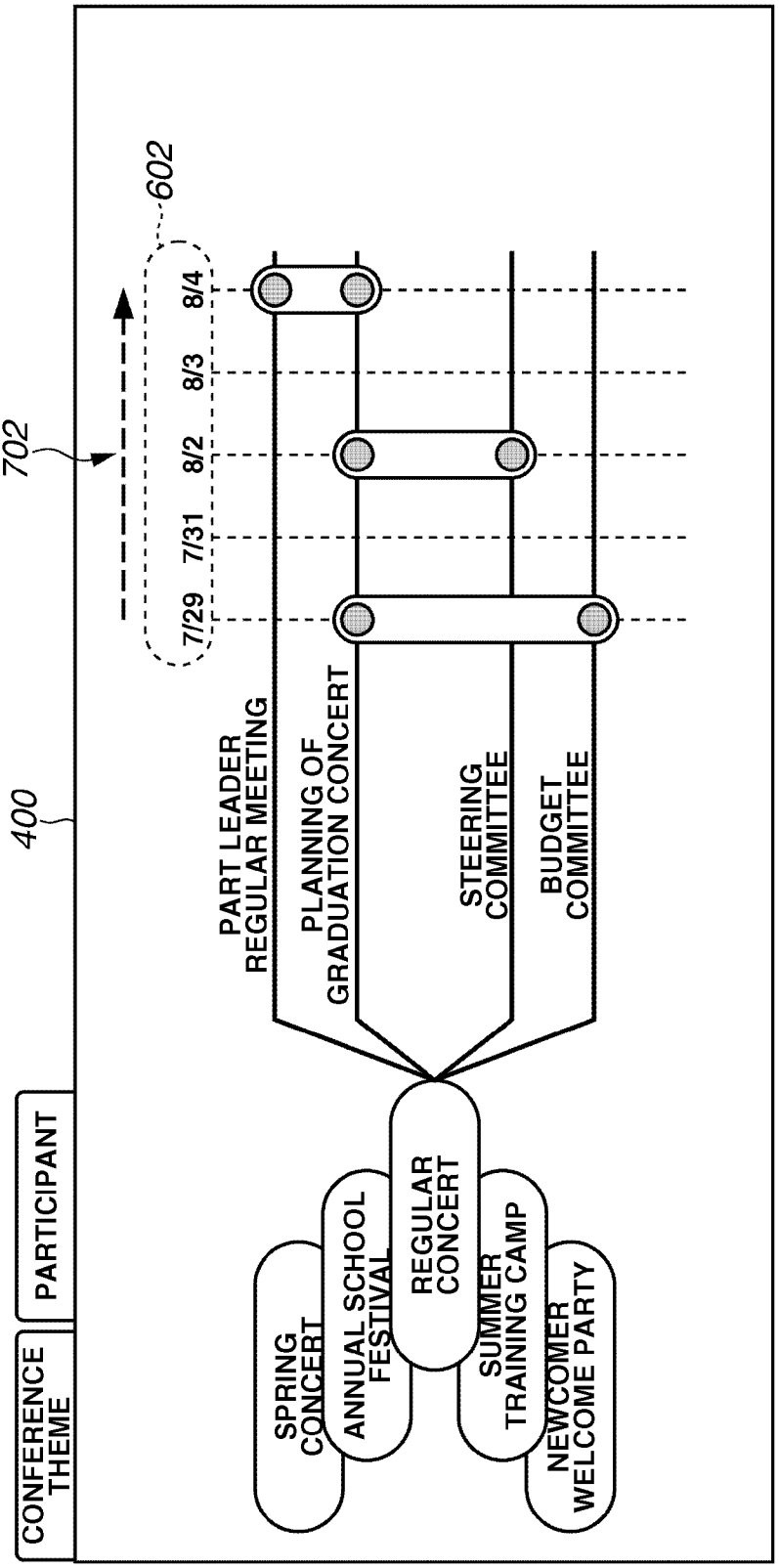

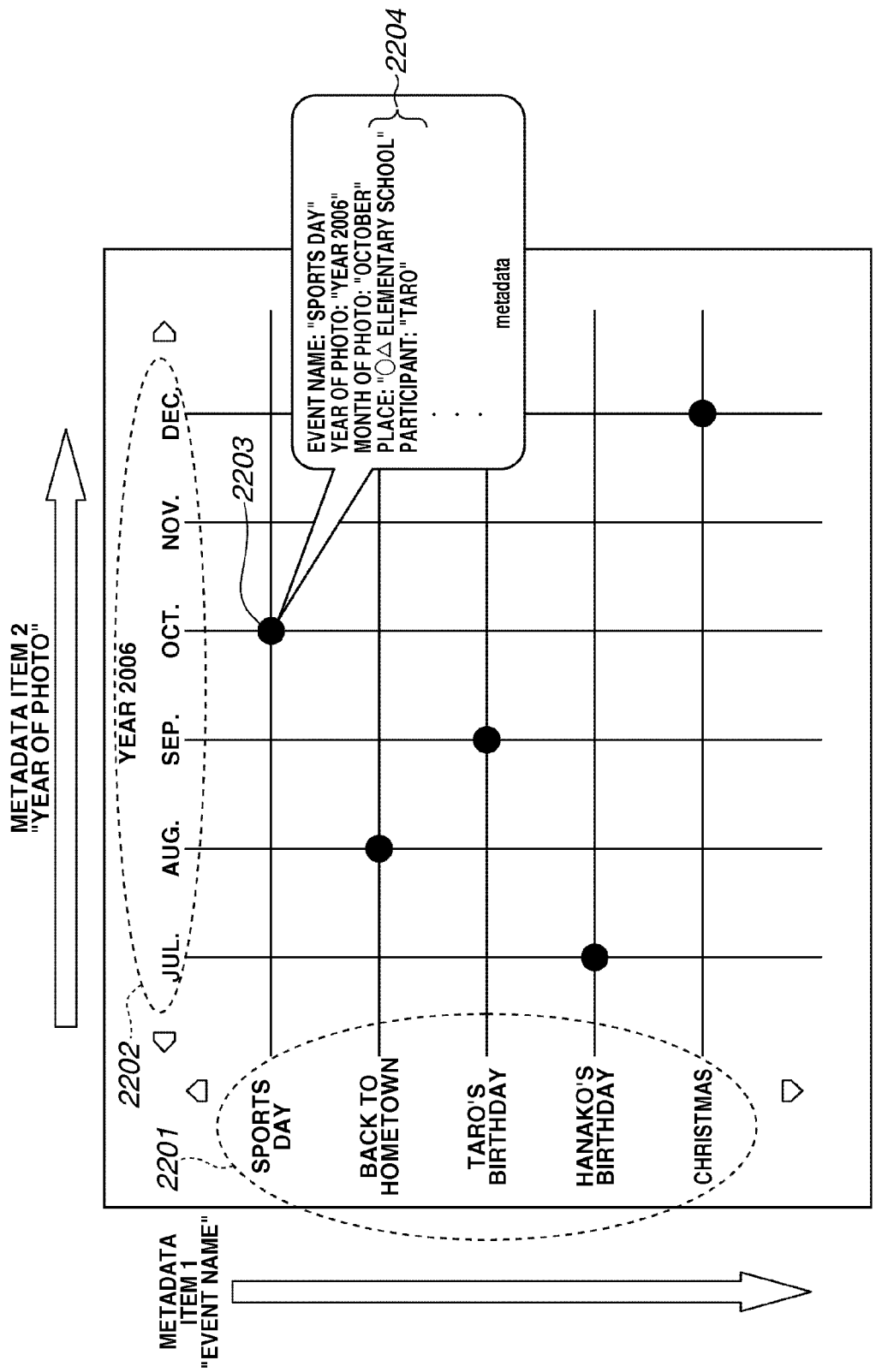

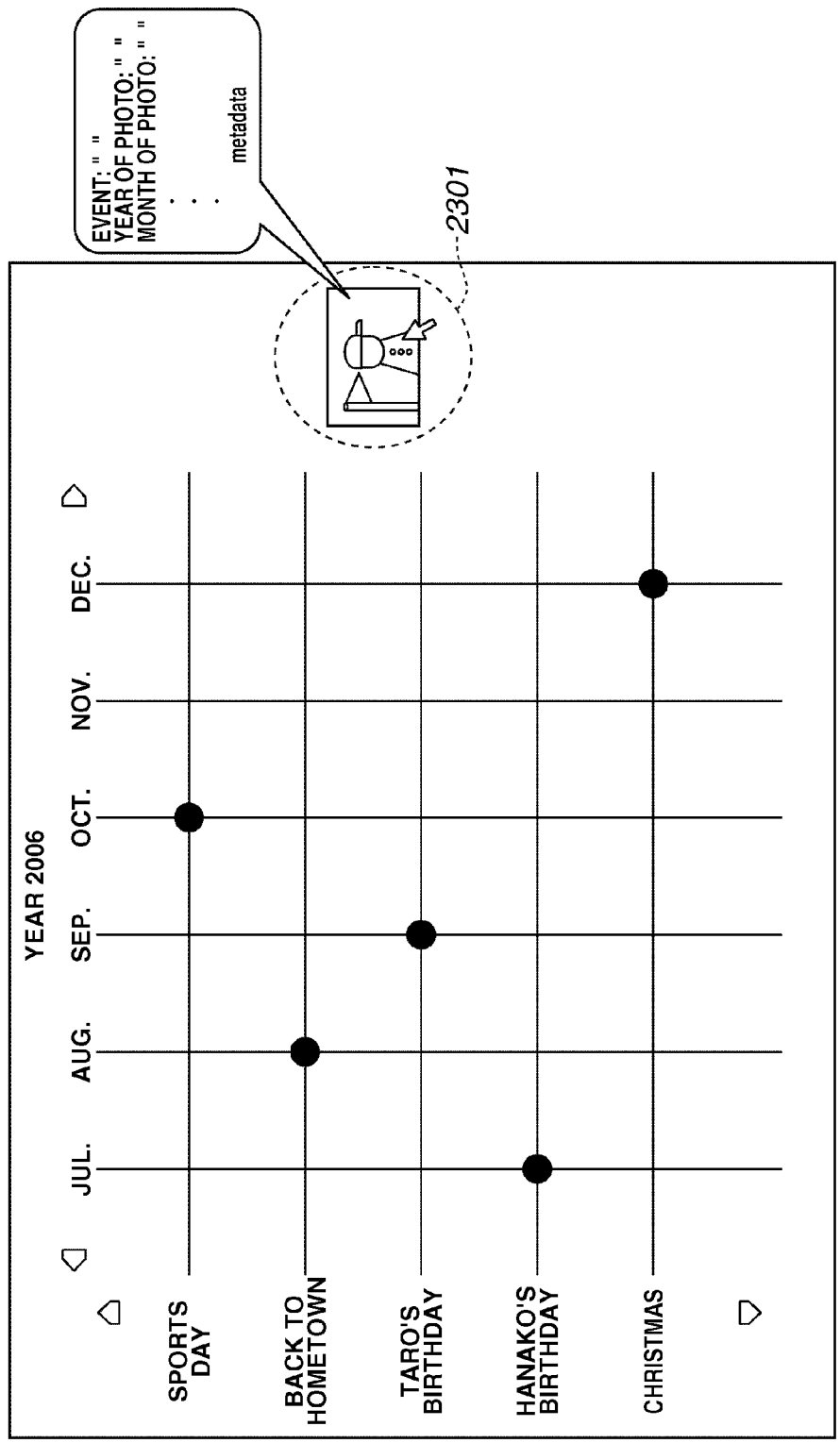

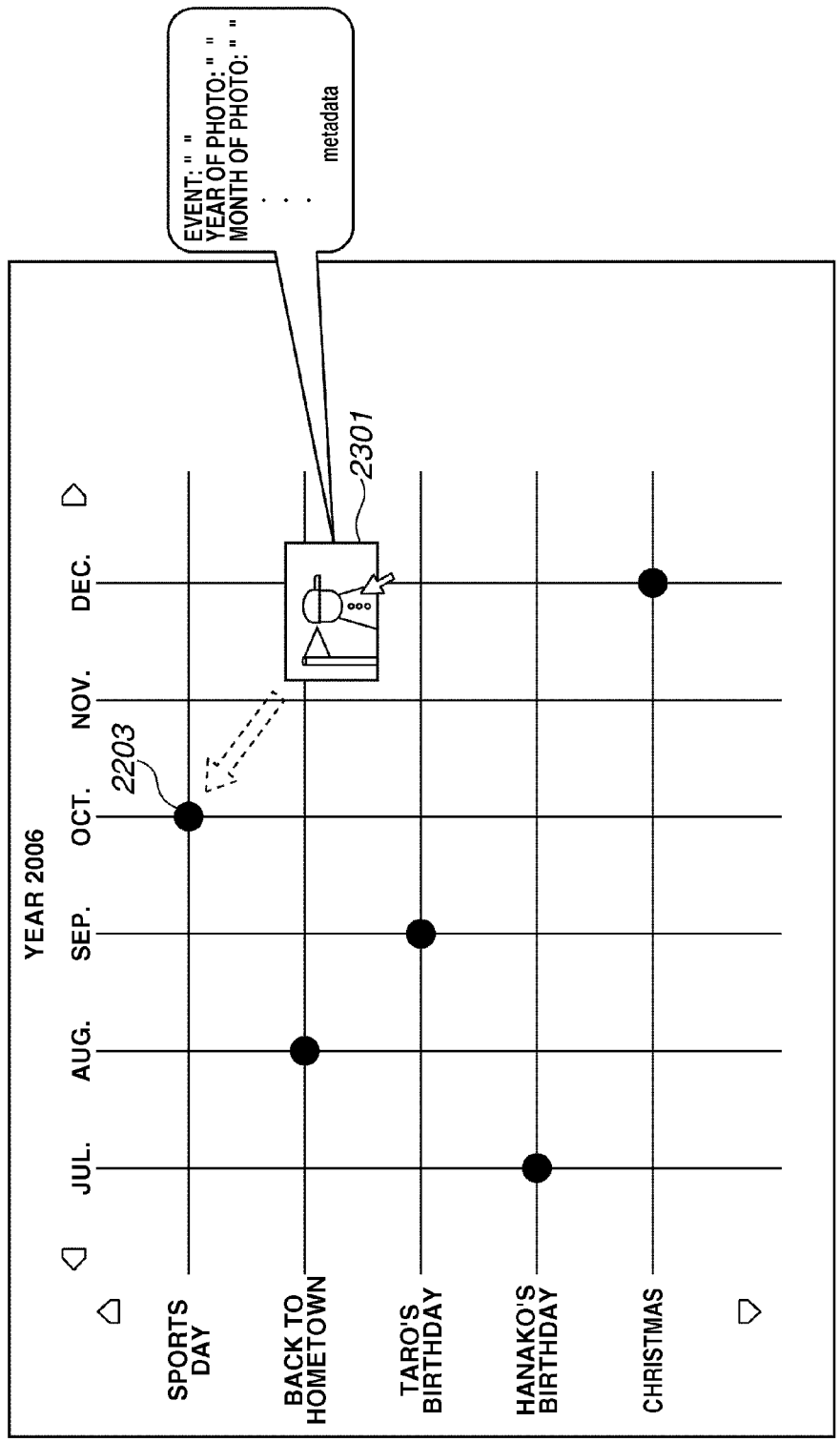

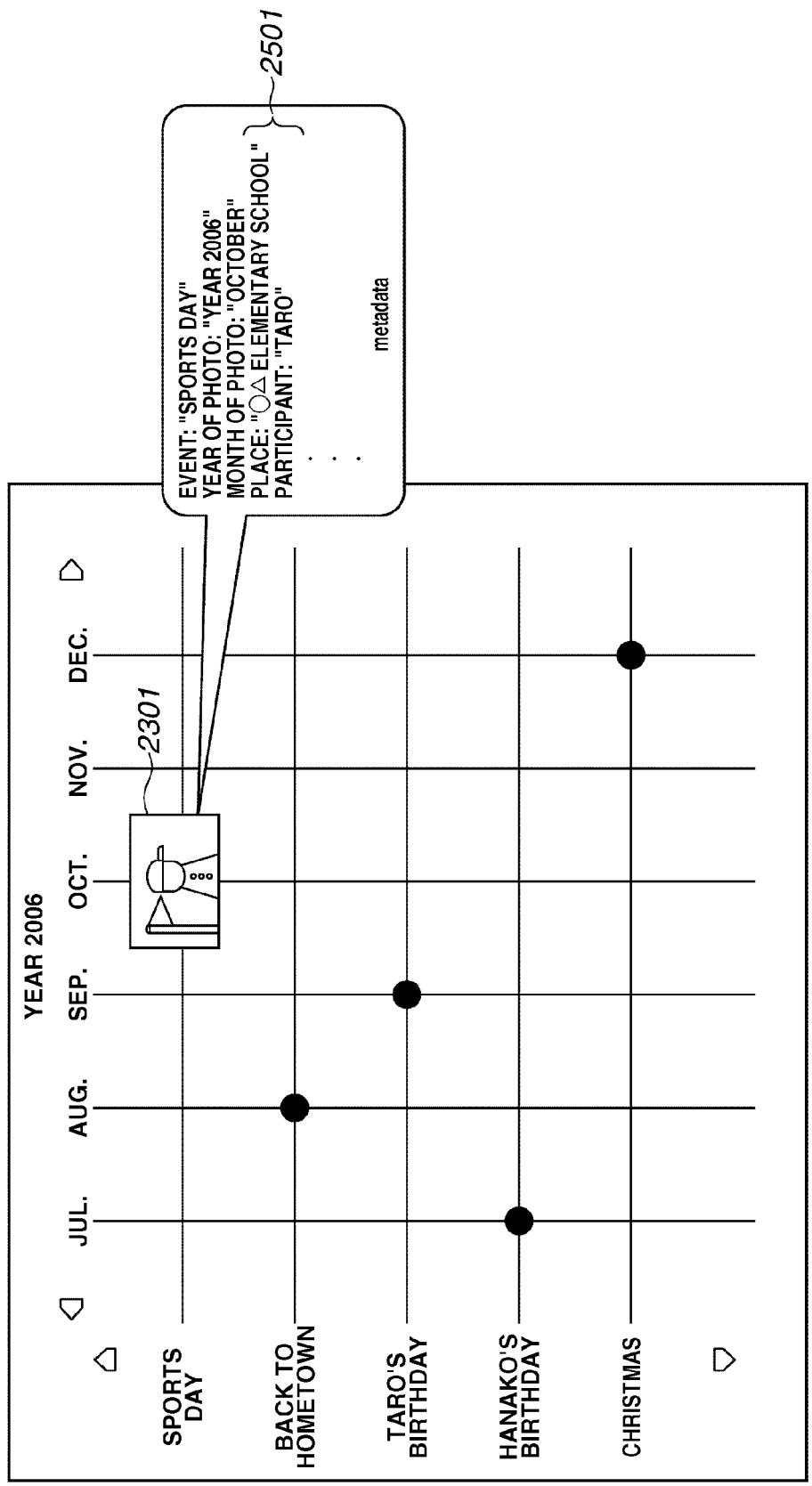

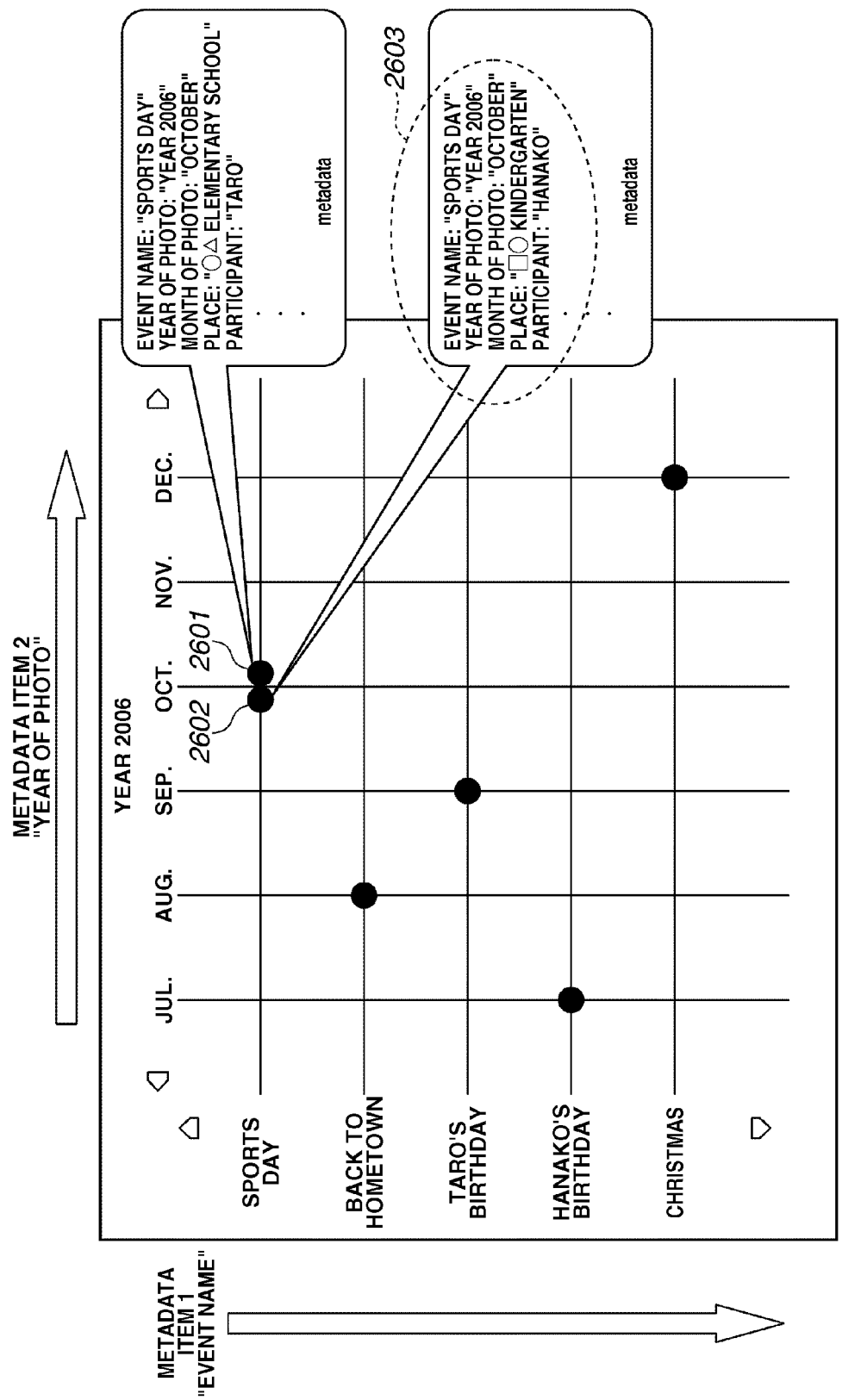

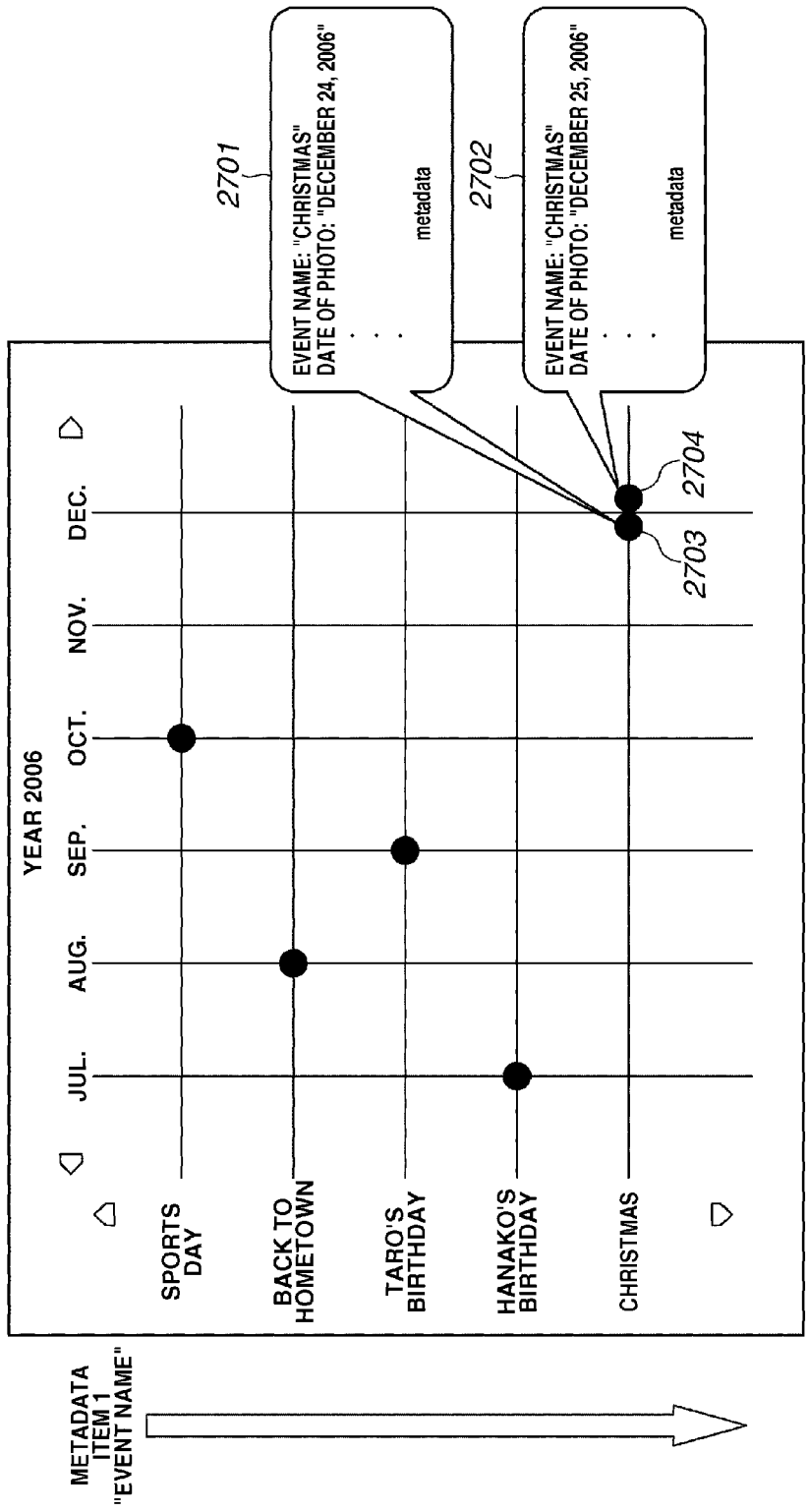

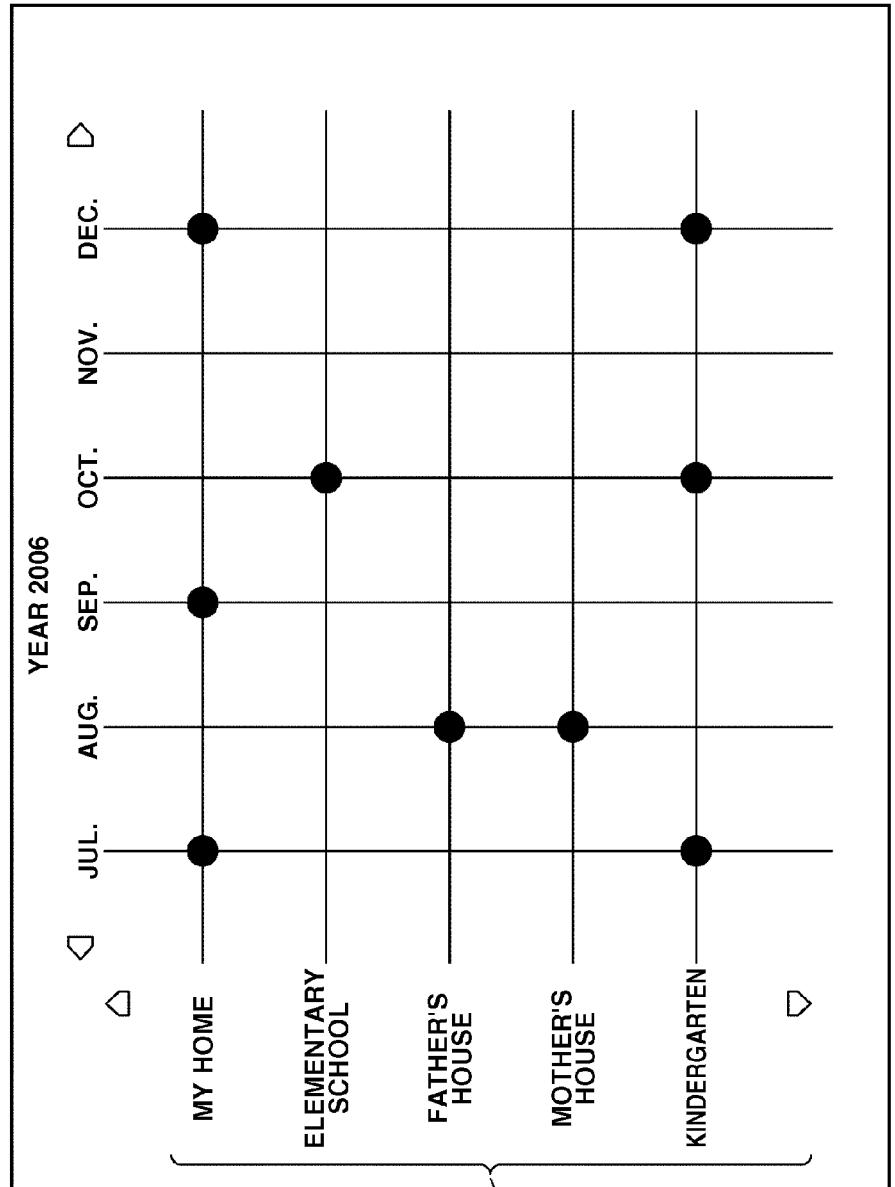

INFORMATION PROCESSING APPARATUS AND INFORMATION PROCESSING METHOD

BACKGROUND OF THE INVENTION

1. Field of the Invention

The present invention relates to an information processing system that can process metadata-added electronic data. Furthermore, the present invention relates to an information processing system that can add metadata to electronic data.

2. Description of the Related Art

Recent personal computers, digital still cameras, digital video cameras, and hard disk recorders are electronic devices capable of generating electronic data and storing generated electronic data. Thus, an information processing apparatus is required to process a large amount and various kinds of (or a wide variety of) electronic data generated and stored by these electronic devices.

To effectively utilize a large amount and various kinds of electronic data, it is preferable that an information processing system can acquire necessary electronic data anytime and can reuse the acquired electronic data.

Such a system can be realized by a unit configured to execute a method for adding auxiliary electronic data (related data) to electronic data. In general, this kind of auxiliary electronic data can be referred to as "metadata."

If metadata is added to electronic data beforehand, a user can retrieve and acquire any electronic data to which metadata is added (hereinafter, referred to as "main data") according to various conditions. A user can also acquire information which cannot be directly read from the main body data (e.g., information relating to generation of main body data) based on metadata added to the acquired main body data.

Adding metadata to electronic data is efficient and effective to reuse main body data. Therefore, it is a recent trend that various types of metadata are added to many electronic data.

Using a table format that can display metadata added to respective electronic data is generally known as an example method for displaying electronic data to enable a user to reuse main body data.

Furthermore, the system discussed in Japanese Patent Application Laid-Open No. 10-187743 uses a three-dimensional display screen including a time axis and a predetermined classification axis capable of expressing a group of electronic data and enables a user to visually recognize electronic data and easily reuse main body data.

However, according to the display method discussed in the above-described Japanese Patent Application Laid-Open No. 10-187743, the same electronic data may be displayed at a plurality of different positions depending on a setting of the classification axis. In this case, this conventional method does not explicitly display a mutual relationship between electronic data. Therefore, a user cannot recognize the relevance between two electronic data (e.g., same electronic data) before the user confirms the contents of respective electronic data. Thus, the above-described conventional display method deteriorates the operability of a user who wants to acquire desired electronic data.

Furthermore, according to the above-described display method, one-dimensional classification information is arrayed on the classification axis, and a user cannot recognize a mutual relationship between classification information.

Furthermore, it takes a long time to acquire electronic data if a setting of the classification axis is inappropriate.

In view of the above-described problems, the present invention is directed to enabling a user to easily acquire electronic data from a group of metadata added electronic data.

In general, a user directly inputs or designates metadata to be added to main body data. For example, if there is image data captured by a digital still camera, a user inputs many metadata (e.g., information of captured object, title, message, and comment) via an input unit (e.g., a keyboard). Therefore, it is desired to improve the system to reduce the work load of a user who adds metadata to main body data.

To solve the above-described problem, the system discussed in Japanese Patent Application Laid-Open No. 2002-55748 registers an icon representing metadata if it is frequently added to main body data, and enables a user to simply add metadata contents by moving the icon to the main body data.

The method discussed in the above-described Japanese Patent Application Laid-Open No. 2002-55748 is effective for a user who repetitively performs addition of typical metadata. However, this conventional method is not efficient for a user who frequently increases or decreases the number of metadata items added to each main body data or changes metadata values.

SUMMARY OF THE INVENTION

Exemplary embodiments of the present invention are directed to a technique capable of reducing the work load of a user who adds metadata to main body data.

According to an aspect of the present invention, an information processing apparatus includes an area display unit configured to display a metadata area including metadata values arrayed for each metadata item and unique areas defined for respective metadata values, an icon display unit configured to display an icon associated with main body data and enabling a user to add the metadata, and an adding unit operable if the displayed icon is moved to a position on the metadata area and configured to add information defining a unique area to which the position of the moved icon belongs, as metadata, to main body data associated with the icon.

According to another aspect of the present invention, an information processing apparatus for processing a plurality of electronic data including metadata added to main body data, includes a regulation unit configured to array and display metadata values involved in the plurality of electronic data for each metadata item and regulate a metadata area as unique display area for respective metadata values arrayed and displayed, and an icon display unit configured to display an icon associated with main body data including metadata values arrayed and displayed by the regulation unit, among the metadata added main body data, to a corresponding metadata area.

An exemplary embodiment of the present invention can easily acquire electronic data requested by a user from a group of metadata added electronic data. An exemplary embodiment of the present invention can reduce the work load of a user who adds metadata to main body data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 4 illustrates an example window displaying results of the content display processing.

FIG. 5A illustrates an example list display of metadata values of a main-class metadata item "conference theme."

FIG. 5B illustrates the display positions of metadata values having moved in a ring-shape on the metadata value list in response to a user's instruction input via a pointing device.

FIG. 6A illustrates a display example of metadata values arrayed in the vertical direction and corresponding to a "sub theme" which is a sub-class metadata item of the main-class metadata item "conference data."

FIG. 6B illustrates an example display of an array of metadata values corresponding to a "conference date" defined as metadata item to be displayed in the horizontal direction.

FIG. 6C illustrates example icons displayed at corresponding positions on the metadata areas.

FIG. 7A illustrates the display positions of metadata values and corresponding lines moving in the vertical direction along a plane of a metadata value list in response to a user's instruction input via a pointing device.

FIG. 7B illustrates the display positions of metadata values and corresponding lines moving in the horizontal direction along a plane of a metadata value list in response to a user's instruction input via a pointing device.

FIG. 22 illustrates a display example of the metadata area.

FIG. 23 illustrates an example icon associated with main body data (an object to which metadata can be added) displayed on a display device.

FIG. 24 illustrates an example icon moving along the metadata area on which black circular marks are displayed.

FIG. 25 illustrates an example icon having reached the position of a black circular mark on the metadata area.

FIG. 26 illustrates a plurality of main body data acquired by a data acquisition unit, together with black circular marks displayed at corresponding positions on the metadata area.

FIG. 27 illustrates an example display of black circular marks indicating main body data acquired by a data acquisition unit that can recognize an addition of metadata identical to metadata value(s) and metadata item(s) defining a unique area.

FIG. 28 illustrates an example display of a metadata area switched from the display example of the metadata area illustrated in FIG. 22 in response to a designation of another metadata item "place of photo."

DETAILED DESCRIPTION OF THE EMBODIMENTS

Figure 1:
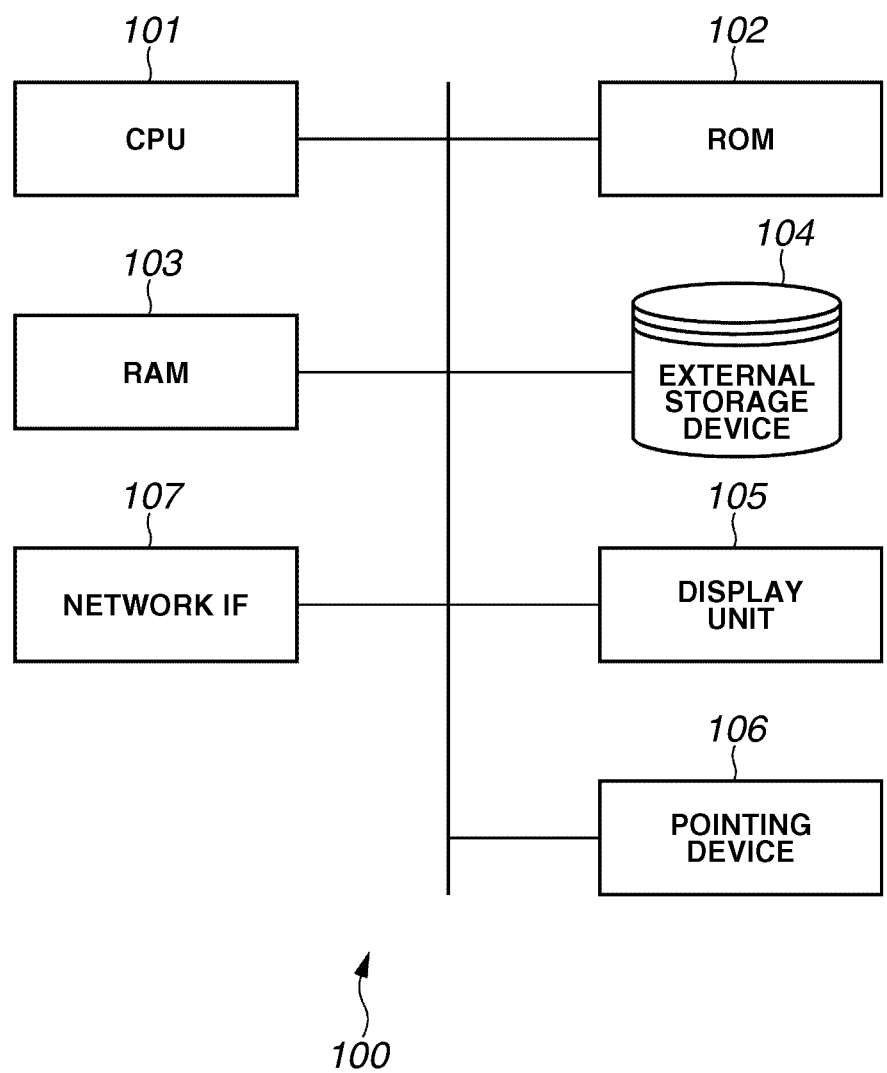
FIG. 1 illustrates a hardware configuration of an information processing apparatus according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

FIG. 1 illustrates a hardware configuration of an information processing apparatus 100 according to a first exemplary embodiment of the present invention.

In FIG. 1, a central processing unit (CPU) 101 performs various controls of the information processing apparatus 100 according to a control program stored in a read only memory (ROM) 102.

The ROM 102 stores control programs for content display processing performed by the CPU 101.

A random access memory (RAM) 103 temporarily stores electronic data. An external storage device 104, such as a magnetic disk, stores a plurality of electronic data (contents) which can be processed as an object in the content display processing. A display unit 105 displays results of the content display processing executed by the CPU 101. A pointing device 106 is, for example, a mouse.

A general computer can realize the content display processing according to an exemplary embodiment. In this case, the external storage device 104 stores a control program supplied from a medium. The CPU 101 executes the control program to realize the content display processing in response to an operator's instruction.

A network interface 107 enables the information processing apparatus 100 to communicate with an external device (not illustrated) which is accessible via a network to perform reading/writing of control program(s) and electronic data.

According to an exemplary embodiment, the external storage device 104 and the display unit 105 can communicate with each other via the network interface 107.

Figure 2:
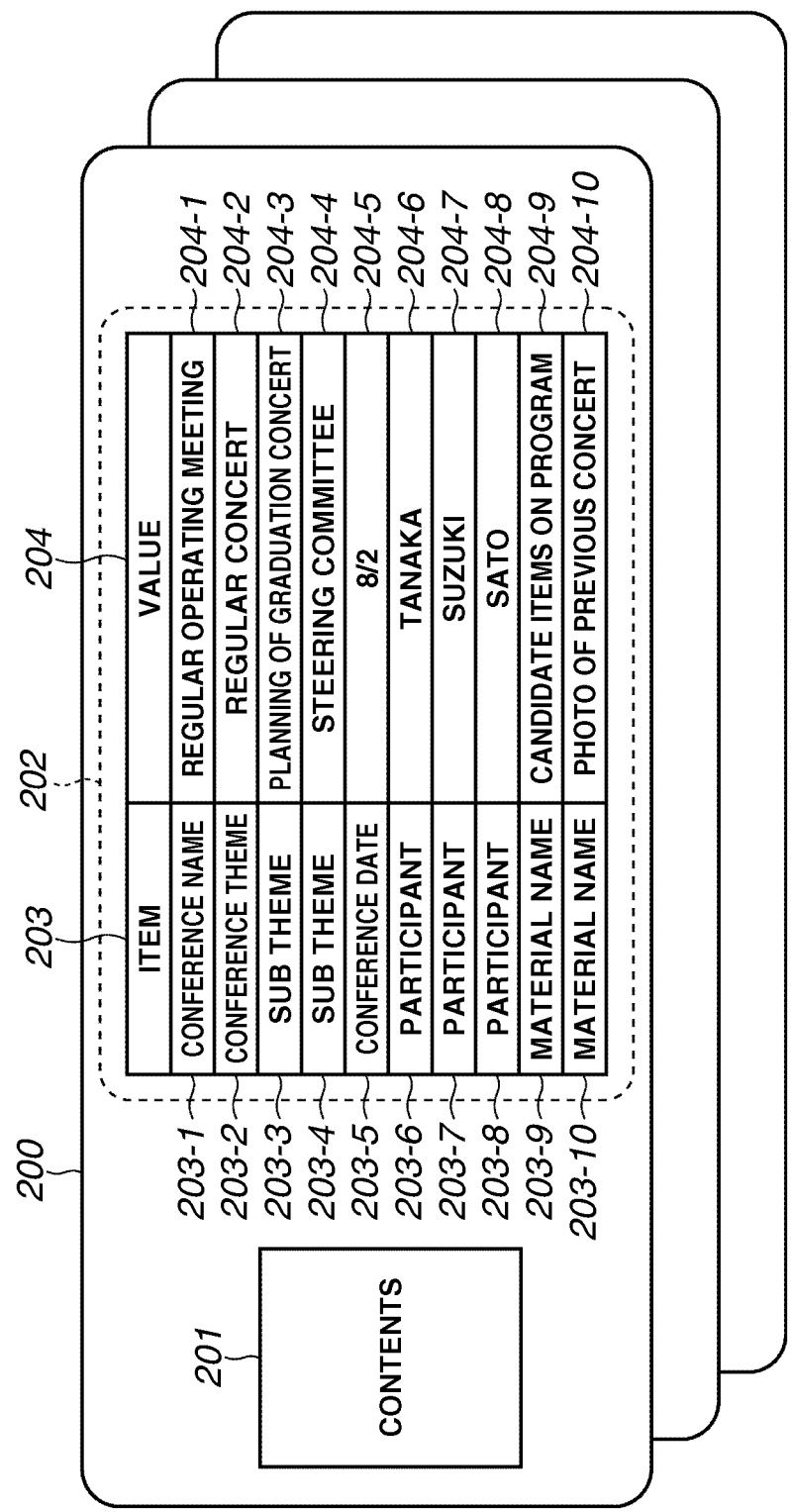
FIG. 2 illustrates example metadata added electronic data (contents) subjected to content display processing.

FIG. 2 illustrates example electronic data (content 200), i.e., a processing object subjected to the content display processing, which includes main body data (content main body) 201 and metadata 202.

The content 200 may include two or more content main bodies 201.

The metadata 202, added to the content main body 201, include paired data of a metadata item 203 and its value (metadata values) 204.

For example, a metadata item "conference name" 203-1 is associated with a metadata value "regular operating meeting" 204-1. Similarly, metadata items 203-2, 203-3, . . . , 203-10 are associated with metadata values 204-2, 204-3, . . . , 204-10, respectively.

The content 200 can regulate a master-slave relationship between items included in the field of the metadata item 203. According to the example illustrated in FIG. 2, a metadata item "conference theme" 203-2 and a metadata item "sub theme" 203-3 are in a master-slave relationship.

Considering the master-slave relationship regulated between the above-described metadata items, the following description refers to the metadata item 203-2 as "main-class metadata item" and refers to the metadata item 203-3 as sub-class metadata item.

The number of metadata item(s) regulated according to a master-slave relationship is not limited to only one. For example, one main-class metadata item may be associated with a plurality of sub-class metadata items which set different metadata values. The example illustrated in FIG. 2 includes two sub-class metadata items "sub theme" 203-3 and 203-4 defined for the main-class metadata item "conference theme" 203-2. A metadata value "planning of graduation concert" 204-3 is set for the sub-class metadata item "sub theme" 203-3. A metadata value "steering committee" 204-4 is set for the sub-class metadata item "sub theme" 203-4.

Figure 3:
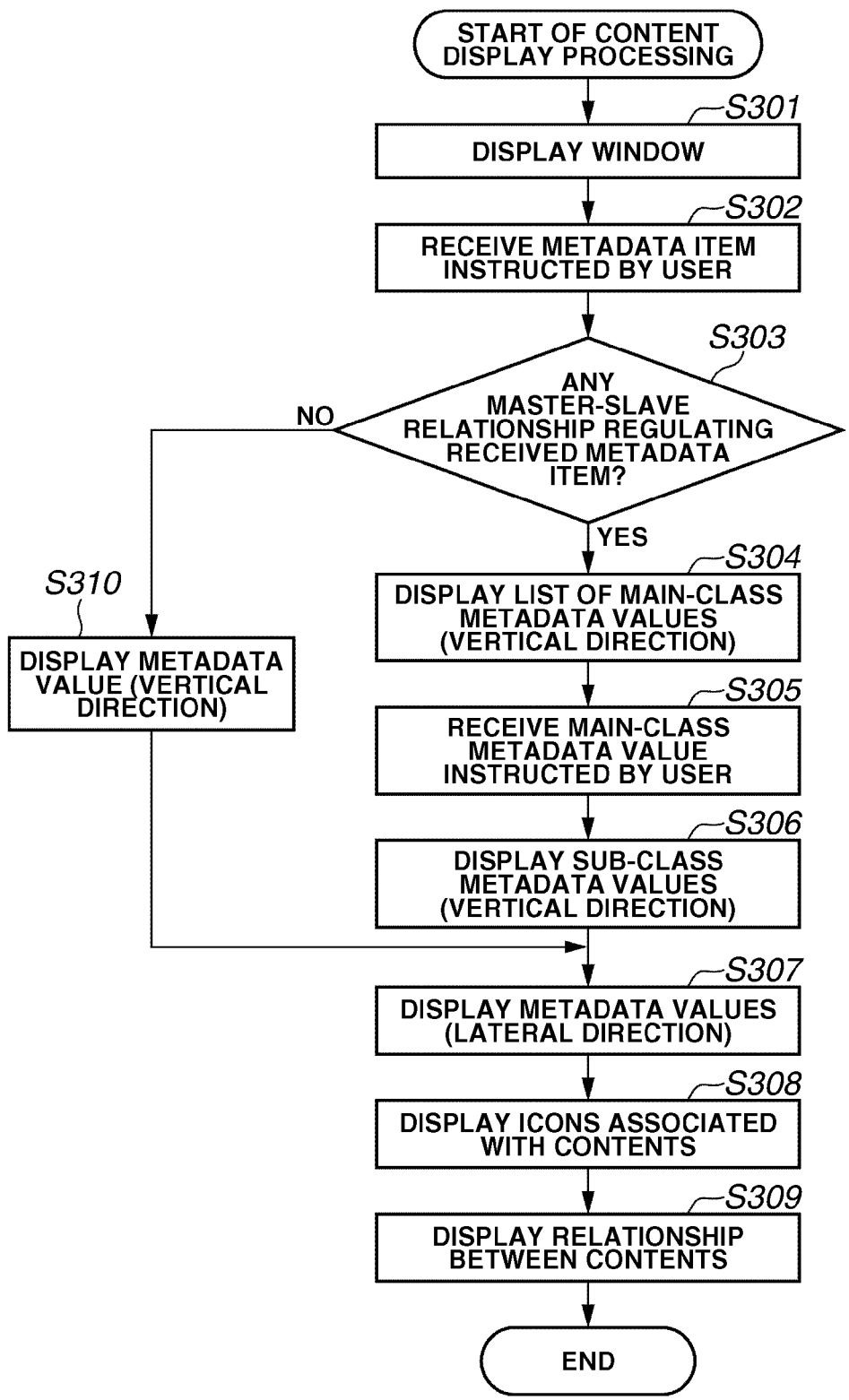
FIG. 3 is a flowchart illustrating example content display processing performed by the information processing apparatus.

FIG. 3 is a flowchart illustrating example content display processing performed by the information processing apparatus 100. FIGS. 4 through 7 illustrate display examples in the content display processing. The information processing apparatus 100 performs the content display processing on a processing object selected from a plurality of contents stored in the external storage device 104, including the content 200 illustrated in FIG. 2.

At step S301, the information processing apparatus 100 causes the display unit 105 to open a window that displays results of the content display processing performed by the CPU 101.

FIG. 4 illustrates an example window 400 that displays results of the content display processing. As illustrated in FIG. 4, the window 400 has a tab 401 for the metadata item "conference theme" and a tab 402 for the metadata item "participant." Each tab can display pre-defined metadata items arrayed in the vertical direction within the area of the window 400.

At step S302, the information processing apparatus 100 receives a metadata item instructed by a user. The instruction of a metadata item can be realized by a user who designates, via a pointing device, a desired tab from the tabs added to the window 400.

It is now assumed that the tab 401 for the metadata item "conference theme" is instructed by a user.

At step S303, the information processing apparatus 100 determines whether there is any master-slave relationship regulating the instructed metadata item. If in step S303 the information processing apparatus 100 determines that there is a master-slave relationship regulating the instructed metadata item (YES in step S303), i.e., if the information processing apparatus 100 determines that the instructed metadata item is a main-class metadata item, the processing flow proceeds to step S304.

At step S304, the information processing apparatus 100 displays, on the window, a list of metadata values corresponding to the main-class metadata item. FIG. 5A illustrates an example list display of metadata values corresponding to the main-class metadata item "conference theme", while the non-instructed tab 402 is grayed out.

As illustrated in FIG. 5A, the window 400 displays a metadata value list 501 corresponding to the metadata item "conference theme", i.e., one of the metadata added to the contents stored in the external storage device 104, which are arrayed in the vertical direction.

According to the example illustrated in FIG. 5A, the metadata value list 501 includes items of "annual school festival" (503), "regular concert" (504), "summer training camp" (505), "newcomer welcome party" (506), and "spring concert" (507) which are arrayed in the vertical direction.

The example window illustrated in FIG. 5A does not display the vertically arrayed metadata values straight along the same column in the metadata value list 501. The metadata value displayed at the foremost position is a metadata value positioned at the central position of the metadata value list 501 ("summer training camp" (505) according to the example illustrated in FIG. 5A). The example window displays other metadata values stepwise at rearward positions relative to the central metadata value in proportion to the distance from the central metadata value.

The display positions of respective metadata values move in a ring-shape within the area of the metadata value list 501 based on a user's instruction.

FIG. 5B illustrates the display positions of metadata values having moved in a ring-shape on the metadata value list 501 in response to a user's instruction input via the pointing device 106. If a user moves the pointing device 106 in the vertical direction, the display positions of the metadata values move in a ring-shape on the metadata value list 501 as indicated by a dotted arrow 502.

According to the example illustrated in FIG. 5B, positions of the metadata values 503 to 506 move downward in the vertical direction while maintaining an array order of them. The position of the metadata value "spring concert" (507) moves from the lowermost position (terminal end in the vertical direction) to the uppermost position (starting end in the vertical direction). Furthermore, as a result of sequential movement of metadata values in the vertical direction, the metadata value "regular concert" (504) located at the central position of the metadata value list 501 is displayed at the foremost position.

Referring back to FIG. 3, at step S305, the information processing apparatus 100 receives a metadata value which a user has instructed from the metadata values (503~507) corresponding to the main-class metadata item "conference theme." More specifically, the information processing apparatus 100 receives one metadata value which a user has instructed from the metadata value list 501 illustrated in FIG. 5A.

The instruction of a metadata value can be realized by a user who moves, via the pointing device 106, a user's desired metadata value to the center of the metadata value list 501 in the vertical direction as illustrated in FIG. 5B and inputs a determination instruction via the pointing device 106. The determination instruction can be also input by a user who clicks on a display position of the metadata value or presses a determination button (not illustrated). Moreover, a user can double click on any metadata value, if it is not centered in the metadata value list 501, to move the metadata value to the central position and simultaneously input the above-described determination instruction.

At step S306, the information processing apparatus 100 arrays and displays metadata values in the vertical direction which correspond to a sub-class metadata item (i.e., a metadata item in a master-slave relationship with a main-class metadata item corresponding to the instructed metadata value). Thus, metadata values are arrayed and displayed for each metadata item. Furthermore, the information processing apparatus 100 regulates a metadata area (a unique display area) for respective metadata values arrayed and displayed.

FIG. 6A illustrates a display example of metadata values arrayed in the vertical direction and corresponding to the "sub theme", i.e., a sub-class metadata item of the main-class metadata item "conference data."

A metadata value list 601 includes metadata values corresponding to the sub-class metadata item "sub theme", i.e., one of the metadata values added to the contents including the metadata value "regular concert" as a metadata value corresponding to the main-class metadata item "conference theme."

As illustrated in FIG. 6A, the metadata value list 601 of the sub-class metadata item is a tree display of metadata values branched from the metadata value "regular concert" corresponding to the main-class metadata item "conference theme." The tree display includes horizontal lines 603, 604, 605, and 606 which regulate unique display areas (metadata areas) of respective metadata values corresponding to the sub-class metadata item.

For example, the line 603 regulates a metadata area for a metadata value "part leader regular meeting" corresponding to the sub-class metadata item "sub theme."

Referring back to FIG. 3, if in step S303 the information processing apparatus 100 determines that there is not any master-slave relationship regulating the instructed metadata item (NO in step S303), the processing flow proceeds to step S310.

At step S310, the information processing apparatus 100 displays metadata values corresponding to the metadata item instructed by the processing of step S302 in the vertical direction. The list display of the metadata values in step S310 is similar to the list display of the metadata values corresponding to the sub-class metadata item in step S306.

However, the list display in step S310 does not define any master-slave relationship. Therefore, unlike the list display of the metadata values corresponding to the sub-class metadata item in step S306, the list display in step S310 does not use a tree display of metadata values branched from a metadata value corresponding to the main-class metadata item. The list display in step S310 simply displays metadata values and lines regulating metadata areas.

At step S307, the information processing apparatus 100 displays metadata values in the horizontal direction which correspond to metadata item(s) other than the metadata item which includes a setting of metadata values displayed in the vertical direction as the metadata value list 601.

This embodiment defines a metadata item "conference date" to be displayed in the horizontal direction, as a metadata item other than the main-class metadata item "conference theme" and the sub-class metadata item "sub theme."

FIG. 6B illustrates an example display of an array of metadata values corresponding to the "conference date" defined as a metadata item to be displayed in the horizontal direction. As illustrated in FIG. 6B, the window 400 displays a list 602 of metadata values arrayed in the horizontal direction and corresponding to the metadata item "conference date", i.e., one of the contents stored in the external storage device 104.

The window 400 displays vertical lines 607 through 611 representing metadata areas defined for respective metadata values of the metadata value list 602.

For example, the line 607 indicates a metadata area defined for a metadata values "7/26" corresponding to the metadata item "conference date."

At step S308, the information processing apparatus 100 displays icons of contents, to which corresponding metadata values (metadata values arrayed and displayed in the vertical and horizontal directions) are added, at crossing areas of the horizontal lines 603 to 606 and the vertical lines 607 to 611 (i.e., metadata areas).

FIG. 6C illustrates example icons displayed at corresponding positions on the metadata areas. An icon 612 illustrated in FIG. 6C is associated with the content 200 illustrated in FIG. 2, according to which a metadata value corresponding to the sub-class metadata item "sub theme" is a "planning of graduation concert" and a metadata value corresponding to the metadata item "conference date" is "8/2." Accordingly, the display position of the icon 612 is a crossing area of the lines 604 and 611.

The area where lines arrayed and displayed in the vertical and horizontal directions and corresponding to metadata values cross each other is an area indicating that two metadata values are added. In other words, the icon visualizes the metadata value added to the content 200.

The content 200 includes the "steering committee" added as a metadata value corresponding to the metadata item "sub theme." Therefore, the window 400 displays an icon 613 associated with the content 200 at a crossing area of lines 605 and 611 corresponding to the metadata value "steering committee" corresponding to the sub-class metadata item "sub theme."

In other words, the icons 612 and 613 indicate the same contents (i.e., content 200). In this manner, the window 400 displays, at a plurality of positions, the content to which a metadata item including a setting of a plurality of different metadata values is added, with respect to the same sub-class metadata item. Therefore, at step S309, the information processing apparatus 100 displays a line 614 (relevance display) indicating a relationship that they are the same content.

Figure 6D:
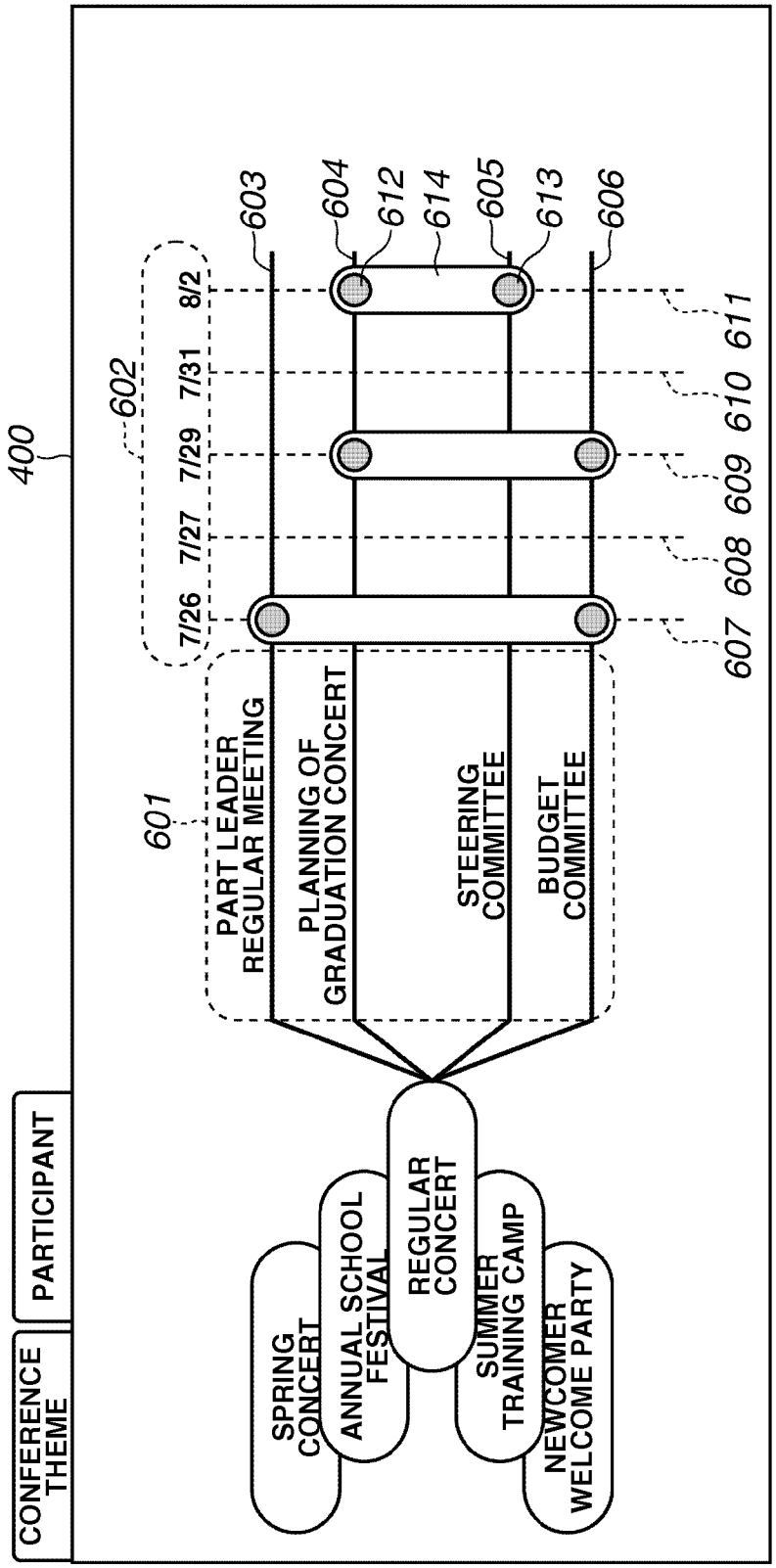
FIG. 6D illustrates an example display of the relevance between contents associated with icons displayed at different positions.

FIG. 6D illustrates an example display of the relevance between contents associated with icons displayed at different positions. As illustrated in FIG. 6D, the line 614 connects two icons 612 and 613 and indicates that two icons 612 and 613 represent the same content.

When the information processing apparatus 100 completes the content display processing illustrated in FIG. 3, the window 400 displays the processing result illustrated in FIG. 6D.

In this state, the information processing apparatus 100 can perform the following operation.

The window 400 according to an exemplary embodiment can move the display positions of respective metadata values corresponding to a sub-class metadata item, together with the corresponding lines 603 through 606, in a ring-shape within the area of the metadata value list 601 according to a user's instruction.

FIG. 7A illustrates the display positions of respective metadata values and corresponding lines moving in the vertical direction along a plane of the metadata value list 601 in response to a user's instruction input via the pointing device 106. If a user holds a line with the pointing device 106 and moves the line in a direction indicated by a dotted arrow 701, the display positions of respective metadata values and the display positions of the corresponding lines can move in a ring-shape along the plane of the metadata value list 601 while maintaining the rotational order.

According to the result illustrated in FIG. 7A, three metadata values "part leader regular meeting", "planning of graduation concert", "steering committee" have moved downward stepwise in the vertical direction. The metadata value "budget committee" displayed at the lowermost position (i.e., a terminal end in the vertical direction) has moved upward to the uppermost position (i.e., a starting end in the vertical direction). Similarly, the corresponding lines 603 through 605 have moved downward stepwise in the vertical direction and the lowermost line 606 has moved upward to the uppermost position.

The window 400 enables a user to input a scroll instruction to change the display positions of respective metadata values on the metadata value list 602, together with the display positions of the corresponding lines 607 through 611, arrayed and displayed in the horizontal direction.

FIG. 7B illustrates the display positions of respective metadata values and corresponding lines moving in the horizontal direction along a plane of the metadata value list 602 in response to a user's instruction input via the pointing device 106. A user, by carrying out scroll on the screen along a dotted arrow 702 as illustrated in FIG. 7B, can select a display range of "7/29" through "8/4" different from the state illustrated in FIG. 6D which displays metadata values "7/26" through "8/2" corresponding to the "conference date."

The information processing apparatus 100 enables a user to drag and drop each icon representing the result of the content display processing into other program (e.g., a content main body display program or an editing program) to invoke the content main body.

As apparent from the foregoing description, an exemplary embodiment of the present invention can visualize metadata values when the window displays a group of metadata added electronic data and can also display the relevance between the same electronic data displayed at different positions.

Furthermore, in the display of metadata values corresponding to a metadata item regulated according to a master-slave relationship, an exemplary embodiment of the present invention can perform a tree display of metadata values branched from a metadata value corresponding to the main-class metadata item to explicitly display the master-slave relationship.

As a result, an exemplary embodiment of the present invention enables a user to easily acquire desired electronic data from the metadata added electronic data group.

Second Exemplary Embodiment

The present invention is not limited to the above-described first exemplary embodiment which displays metadata values arrayed in the horizontal direction and corresponding to the same metadata item. For example, an exemplary embodiment displays an array of metadata values corresponding to each of a plurality of metadata items.

Figure 8:
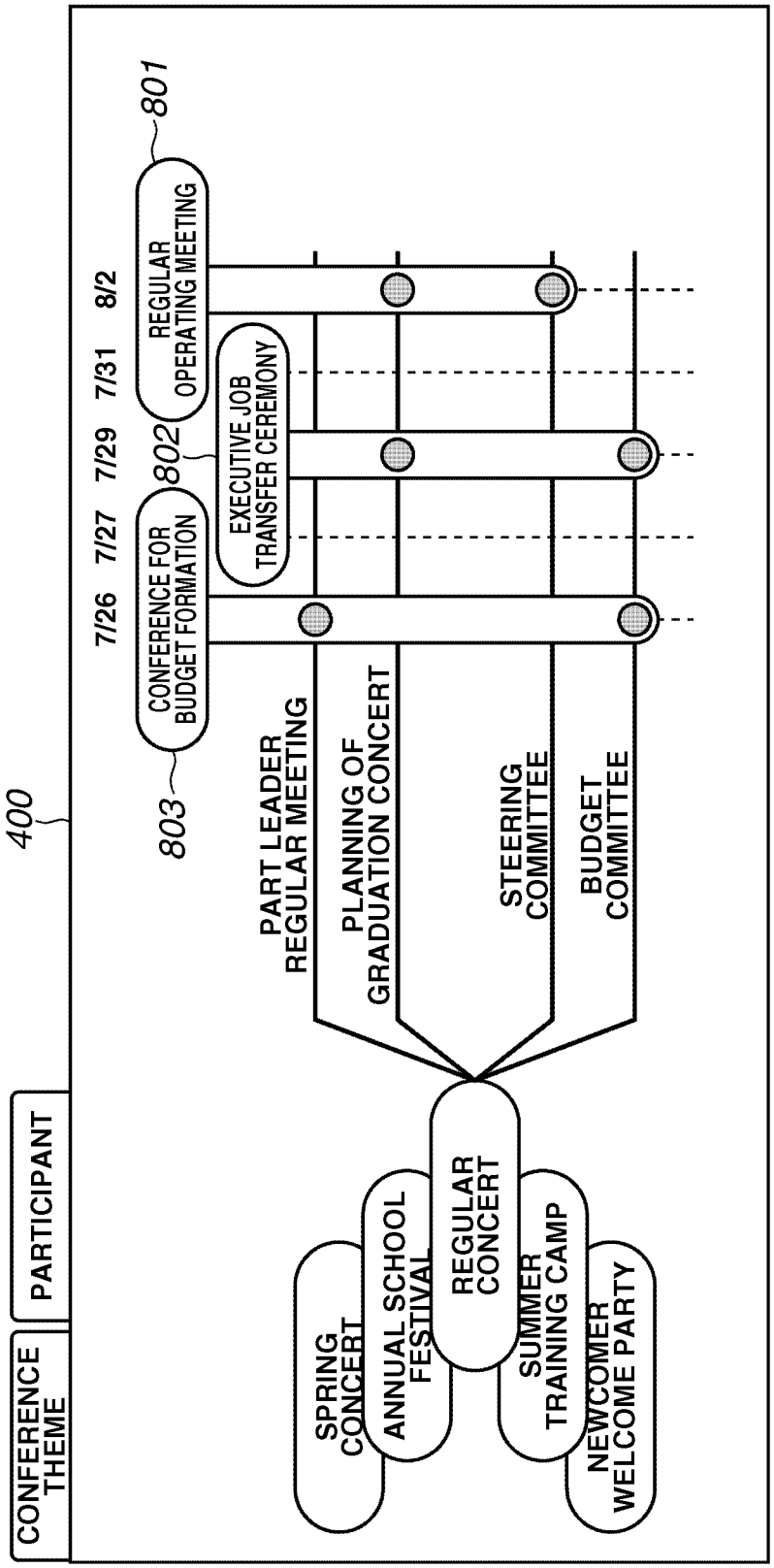
FIG. 8 illustrates an example display of metadata values "conference for budget formation", "executive job transfer ceremony", and "regular operating meeting" corresponding to a metadata item "conference name" arrayed in the horizontal direction, in addition to the display example illustrated in FIG. 6D.

FIG. 8 illustrates an example display of metadata values "conference for budget formation" (803), "executive job transfer ceremony" (802), and "regular operating meeting" (801) corresponding to the metadata item "conference name" arrayed in the horizontal direction, in addition to the display example illustrated in FIG. 6D which is described in the above-described first exemplary embodiment.

In this manner, an exemplary embodiment of the present invention can display a horizontal array of metadata values for each of a plurality of metadata values corresponding to a metadata item and therefore can visualize many metadata values.

Third Exemplary Embodiment

The present invention is not limited to the above-described first and second exemplary embodiments which cannot visualize any metadata values other than the metadata values arrayed and displayed in the horizontal direction or in the vertical direction. An exemplary embodiment does not limit the metadata values to be visualized.

Furthermore, the present invention is not limited to the above-described first and second exemplary embodiments which visualize only the metadata values. An exemplary embodiment performs visualization using a thumbnail of a content main body.

Figure 9:
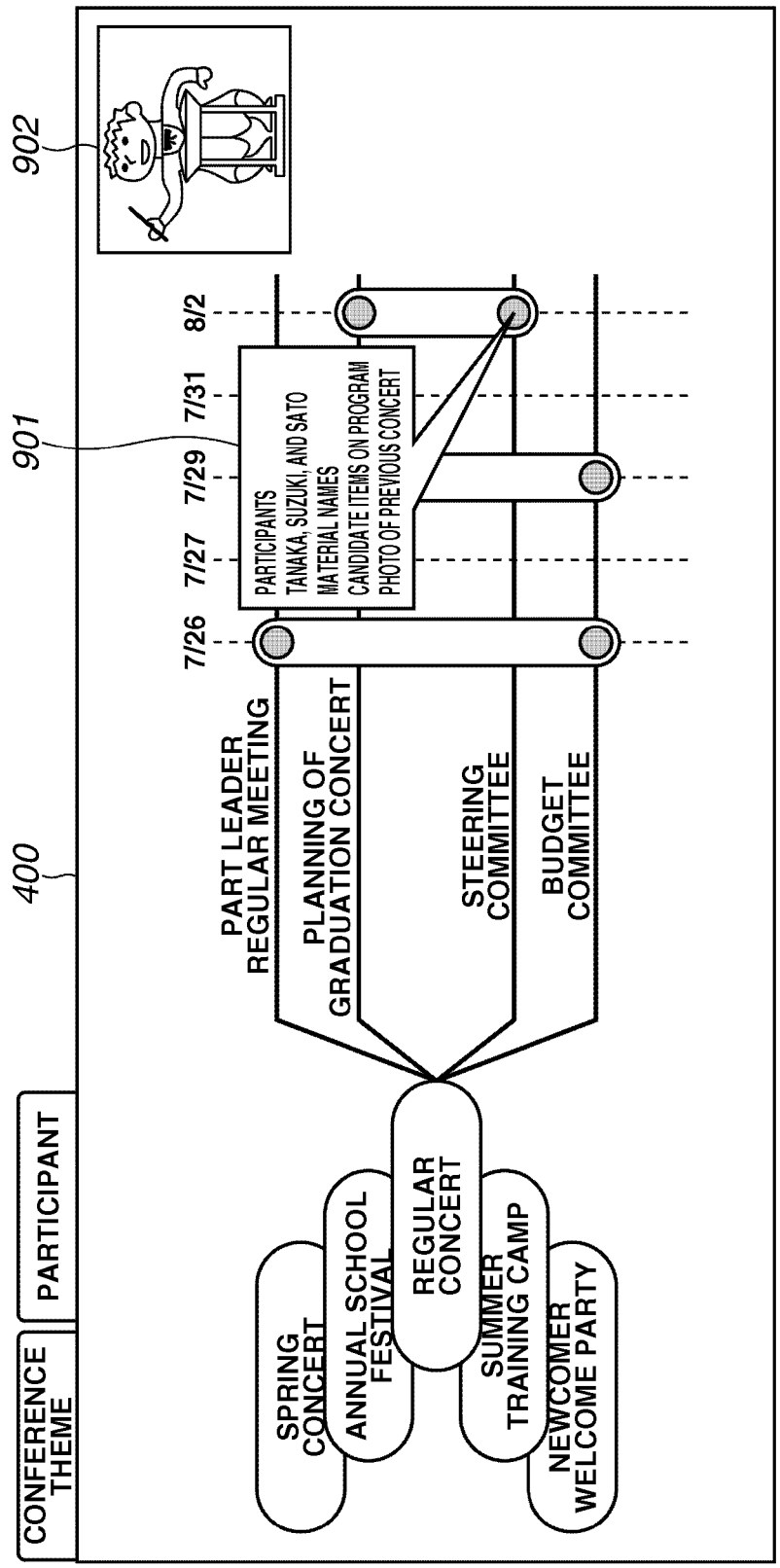
FIG. 9 illustrates an example display of other metadata values (i.e., part of the metadata values added to the content) temporarily displayed in addition to the display of metadata values arrayed in the vertical and horizontal directions.

FIG. 9 illustrates an example display of other metadata values (i.e., part of the metadata values added to the content) temporarily displayed in addition to the display of metadata values arrayed in the vertical and horizontal directions. If a user holding the pointing device 106 moves a cursor to the icon 613, the window 400 displays a pop-up balloon 901 as illustrated in FIG. 9. The balloon 901 includes a display of additional metadata values other than the metadata values displayed in the metadata value lists 601 and 602 together with the metadata item(s) including a setting of the metadata values.

Furthermore, when a user holding the pointing device 106 sets a cursor on the icon 613, the window 400 displays a thumbnail 902 representing a content main body of the content associated with the icon 613 as illustrated in FIG. 9.

As apparent from the foregoing description, an exemplary embodiment can display detailed information about the content instructed by a user and enables the user to easily view or know detailed information selected from a large amount of information relating to electronic data without causing any confusion.

Fourth Exemplary Embodiment

The present invention is not limited to the above-described first to third exemplary embodiments which realize a list display of metadata values corresponding to a main-class metadata item (refer to 501 in FIG. 5). An exemplary embodiment displays only one metadata value instructed by a user.

Figure 10:
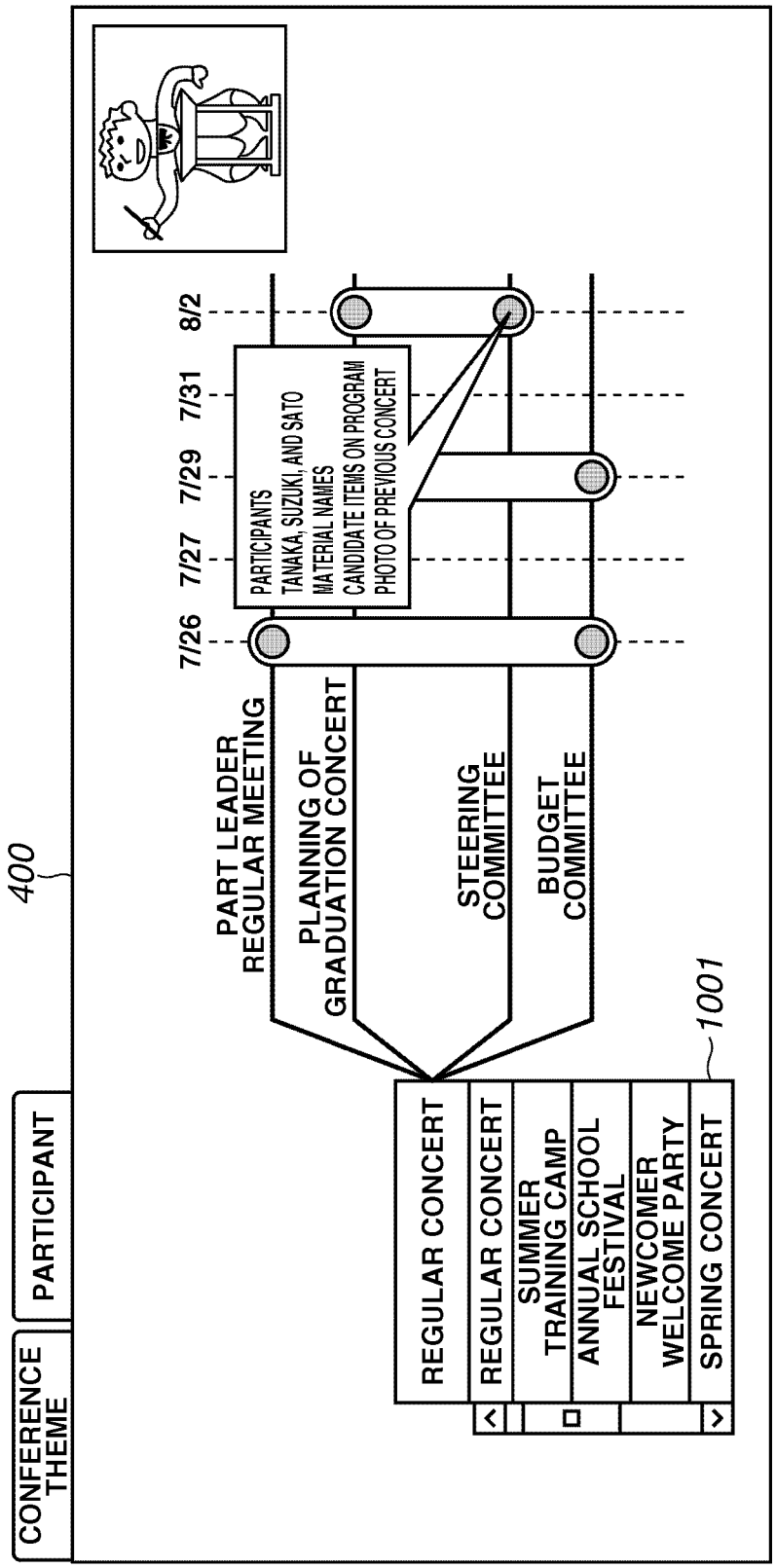
FIG. 10 illustrates an example display of a list box of metadata values corresponding to a main-class metadata item.

FIG. 10 illustrates an example display of a list box 1001 of metadata values corresponding to a main-class metadata item. If a user scrolls on the list box 1001 and selects one of the metadata values corresponding to a main-class metadata item, the window 400 does not display all of the non-selected metadata values in the list box 1001 illustrated in FIG. 10.

As described above, an exemplary embodiment can display a group of electronic data without deteriorating the usability of a user who views and reads electronic data if the user interface (UI) function of the information processing apparatus 100 is effectively available, even if the information processing apparatus 100 has relatively lower performances.

Fifth Exemplary Embodiment

Figure 11:
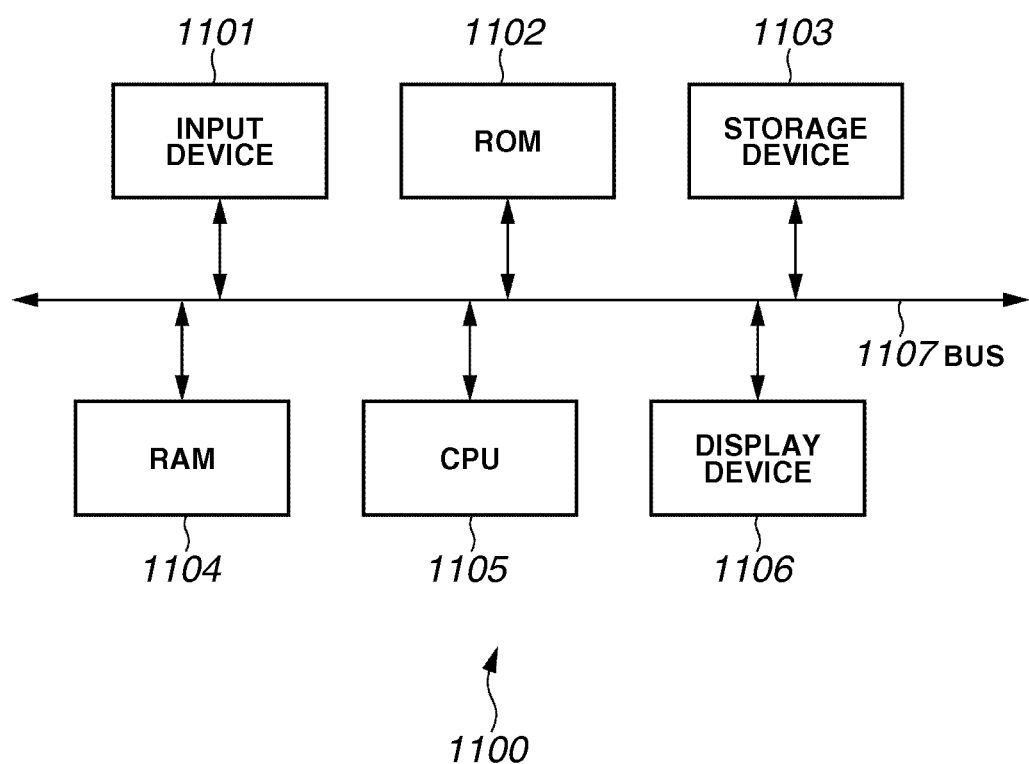
FIG. 11 illustrates a hardware configuration of an information processing apparatus according to a fifth exemplary embodiment of the present invention.

FIG. 11 illustrates a hardware configuration of an information processing apparatus 1100 according to a fifth exemplary embodiment of the present invention.

In FIG. 11, an input device 1101 is a pointing device (e.g., a mouse or a pen) or a numerical keypad which enables a user to perform an input operation (select or move an icon displayed on a display device 1106).

A read only memory (ROM) 1102 stores specific programs and parameters. A storage device 1103 is, for example, a hard disk, a memory card, an optical disk, a magnetic (or optical) card, or an IC card from which electronic data can be read or into which electronic data can be written. Furthermore, the storage device 1103 stores program(s) that can realize a later-described metadata adding function together with electronic data (e.g., main body data and metadata) used in the execution of the program(s).

A random access memory (RAM) 1104 functions as a work memory for a central processing unit (CPU) 1105 that executes various operations according to the program(s). The display device 1106, such as a liquid crystal display unit or any other display unit, displays an icon associated with each main body data. The display device 1106 displays "metadata area(s)" which can array metadata values for each metadata item and define unique areas of respective metadata values having been arrayed.

The above-described units 1101 to 1106 can transmit and receive electronic data via a bus 1107.

Figure 12:
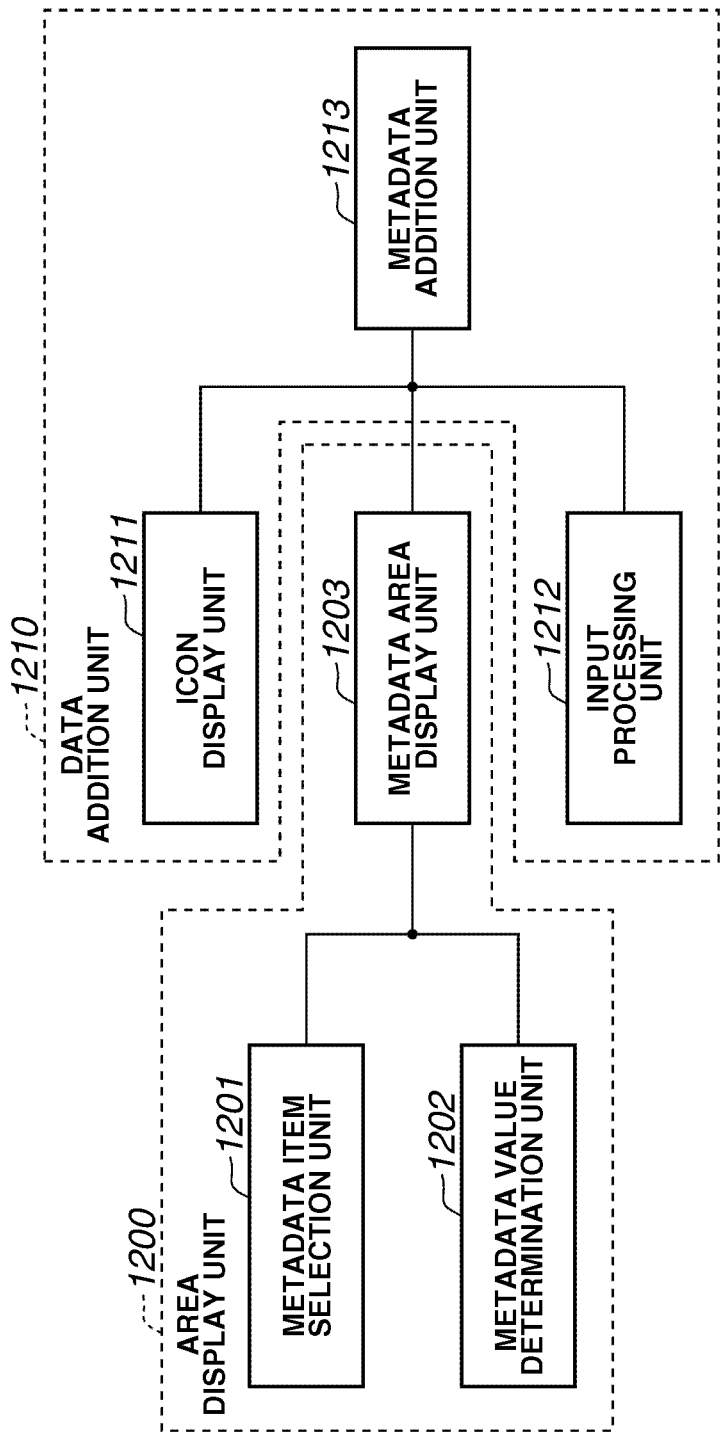
FIG. 12 is a functional block diagram illustrating an information processing apparatus that can realize a metadata adding function.

FIG. 12 is a functional block diagram illustrating the information processing apparatus 1100 that can realize a metadata adding function. As illustrated in FIG. 12, the information processing apparatus 1100 is roughly separated into an area display unit 1200 and a data addition unit 1210 to realize the metadata adding function.

The area display unit 1200 generates two-dimensional area data (i.e., data representing a metadata area) which can express a two-dimensional area including an array of metadata values for each metadata item and a unique area defined for each metadata value. The area display unit 1200 displays the generated area as "metadata area" on the display device 1106.

The data addition unit 1210 includes a metadata addition unit 1213 that enables a user to move an icon on a metadata area displayed on the area display unit 1200 to add metadata value(s) defining unique area(s) and corresponding item(s) to main body data associated with the icon.

A metadata item selection unit 1201 selects metadata item(s) to be added to the main body data by the data addition unit 1210 from metadata added to other main body data already stored in the storage device 1103.

A metadata value determination unit 1202 determines metadata value(s) corresponding to the metadata item selected by the metadata item selection unit 1201, which can be selected from metadata added to other main body data already stored in the storage device 1103.

A metadata area display unit 1203 generates metadata area data that can express a two-dimensional unique area defined by each metadata value(s) to display an array of metadata values determined by the metadata value determination unit 1202 for each metadata item selected by the metadata item selection unit 1201. The metadata area display unit 1203 controls the display device 1106 that displays a metadata area based on the generated metadata area data.

Any graphic display, such as a line segment, a rectangular (or circular) area, or an icon, can express each unique area in the metadata area.

The metadata area can be recognized as a combination of unique areas defined by respective metadata value(s), if metadata values are arrayed for each metadata item. For example, an area where two unique areas cross each other can be recognized as a combination of two metadata items and their values defining the unique areas.

An icon display unit 1211 controls the display device 1106 that displays an icon associated with the main body data (i.e., an object to which metadata can be added). The icon display unit 1211 causes the display device 1106 to perform an icon display following an icon movement instruction input via a later-described input processing unit 1212.

The input processing unit 1212 receives a user's instruction (e.g., selection or move of an icon) input via the input device 1101.

If a user moves an icon to a position on the metadata area, the metadata addition unit 1213 performs processing for adding a metadata value defining a unique area that the position belongs to, as metadata, to main body data associated with the icon. An exemplary embodiment enables a user to input an icon movement instruction by a drag and drop operation.

Figure 13:
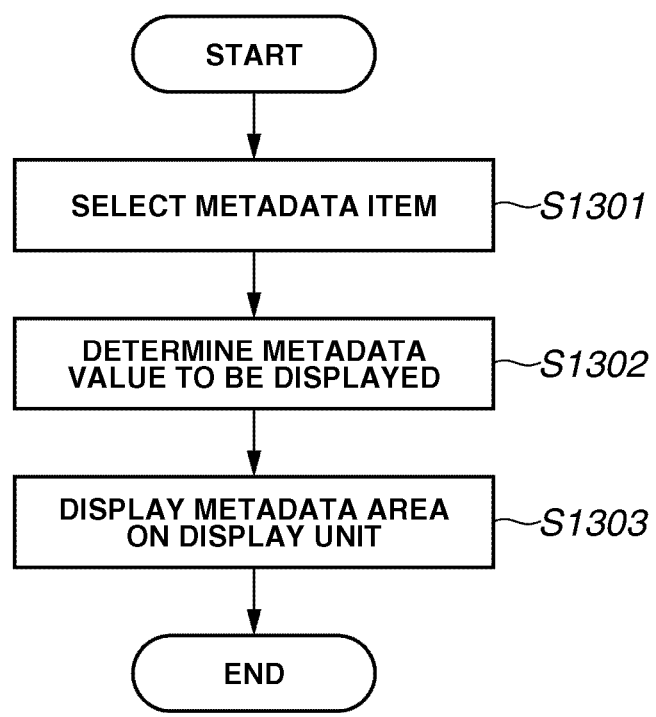
FIG. 13 is a flowchart illustrating example area display processing, as part of metadata adding processing performed by the information processing apparatus.
Figure 14:
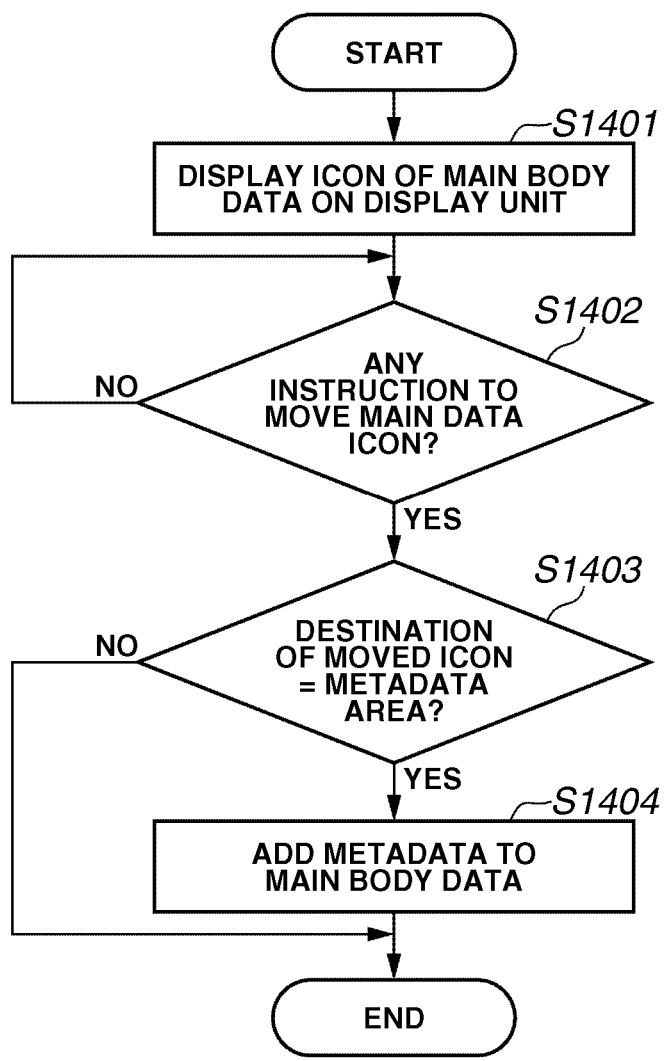
FIG. 14 is a flowchart illustrating example data adding processing, as part of the metadata adding processing performed by the information processing apparatus.

FIGS. 13 and 14 are flowcharts illustrating example metadata adding processing performed by the information processing apparatus 1100 that can realize the metadata adding function.

FIG. 13 is a flowchart illustrating example area display processing performed by the area display unit 1200, as part of the metadata adding processing performed by the information processing apparatus 1100.

At step S1301, the metadata item selection unit 1201 selects a metadata item to be added to main body data from metadata added to other main body data stored in the storage device 1103. According to an exemplary embodiment, the metadata item selection unit 1201 selects a predetermined metadata item.

At step S1302, the metadata value determination unit 1202 determines metadata values corresponding to the metadata item selected by the processing of step S1301, which can be selected from the metadata added to other main body data already stored in the storage device 1103.

At step S1303, the metadata area display unit 1203 generates metadata area data that can express a two-dimensional unique area defined by each metadata value(s) to display an array of the metadata values determined by the processing of step S1302 for each metadata item selected by the processing of step S1301. Furthermore, the metadata area display unit 1203 causes the display device 1106 to display a metadata area based on the generated metadata area data.

Figure 15:
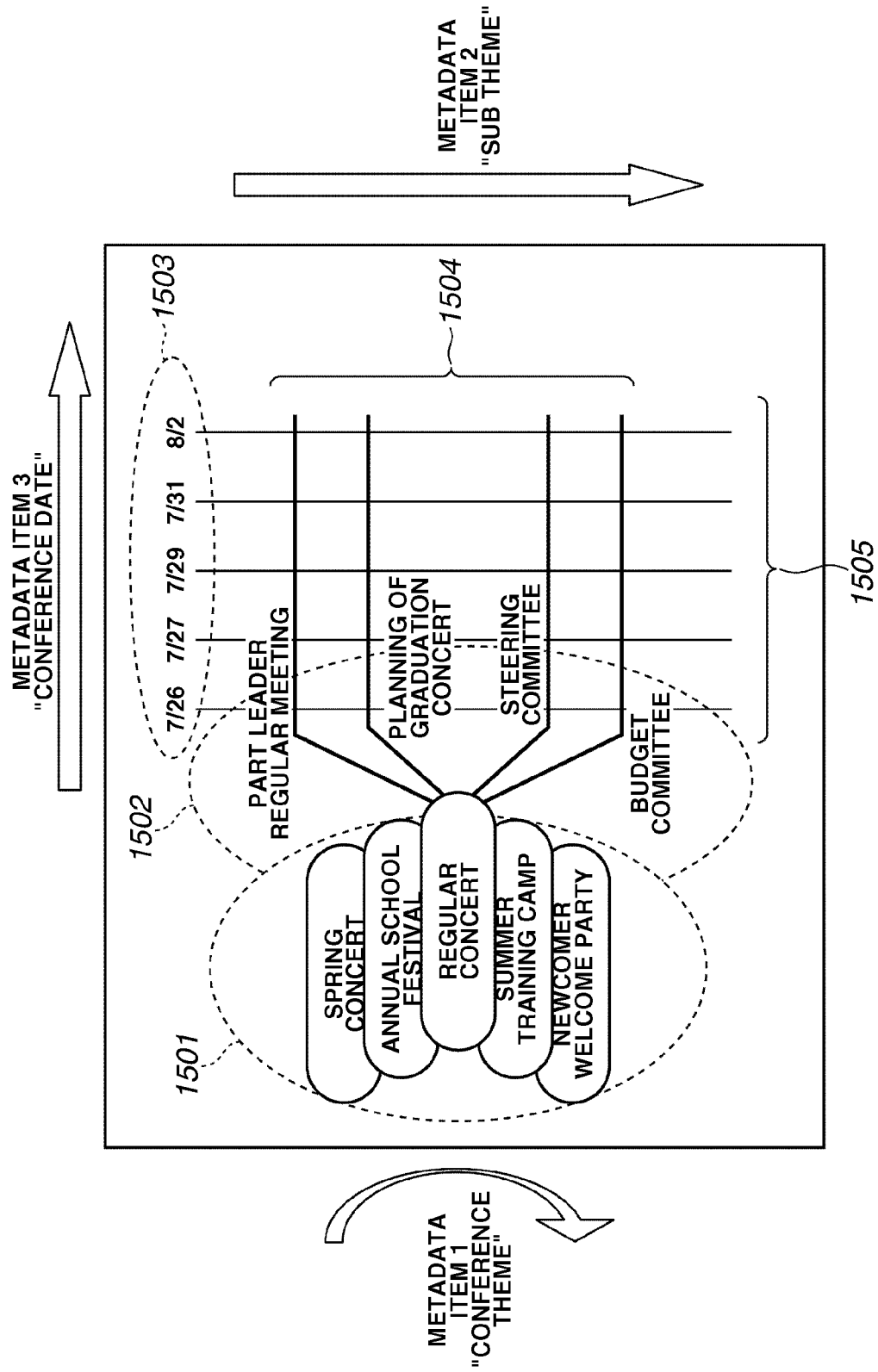
FIG. 15 illustrates an example metadata area in a case where "conference material data" is selected as electronic data to which metadata can be added.

FIG. 15 illustrates an example display result displayed by the display device 1106 as a result of the area display processing illustrated in FIG. 13. FIG. 15 illustrates an example metadata area in a case where "conference material data" is selected as electronic data to which metadata can be added.

According to the example illustrated in FIG. 15, at step S1301, the metadata item selection unit 1201 selects "conference theme", "conference date", and "sub theme" as metadata items. Then, at step S1302, the metadata value determination unit 1202 determines "spring concert", "annual school festival", "regular concert", "summer training camp", and "newcomer welcome party" as metadata values 1501 corresponding to the metadata item "conference theme."

Furthermore, the metadata value determination unit 1202 determines "7/26" through "8/2" as metadata values 1503 corresponding to the metadata item "conference date." Moreover, the metadata value determination unit 1202 determines "part leader regular meeting", "planning of graduation concert", "steering committee", and "budget committee" as metadata values 1502 corresponding to the metadata item "sub theme."

Then, at step S1303, the metadata area display unit 1203 causes the display device 1106 to display the metadata values 1501 corresponding to the metadata item "conference theme" arrayed in the vertical direction and the metadata values 1503 corresponding to the metadata item "conference date" arrayed in the horizontal direction. Furthermore, the display device 1106 displays the metadata values 1502 corresponding to the metadata value "sub theme" arrayed in the vertical direction, at the right side of the metadata values 1501.

The example window illustrated in FIG. 15 displays all metadata values corresponding to the metadata items "conference theme" and "sub theme." However, the metadata values corresponding to the metadata item "conference date" may also include past data. Thus, regarding the display of each metadata area, the window according to an exemplary embodiment may display part of the determined metadata values if a sufficient display space is not available.

In FIG. 15, line segments 1504 extending in the horizontal direction represent unique areas defined by the metadata values corresponding to two metadata items "conference theme" and "sub theme." On the other hand, line segments 1505 extending in the vertical direction represent unique areas defined by the metadata values corresponding to the metadata item "conference date."

The metadata area can be a unique area defined by metadata values corresponding to a plurality of metadata items or a unique area defined by metadata values corresponding to a single metadata item.

According to the example illustrated in FIG. 15, the window displays unique areas mutually crossing perpendicularly as unique areas defined by different metadata values corresponding to different metadata items. However, two unique areas may cross each other at any angle different from 90°.

FIG. 14 is a flowchart illustrating example data adding processing performed by the data addition unit 1210, as part of the metadata adding processing performed by the information processing apparatus 1100.

At step S1401, the data addition unit 1210 causes the display device 1106 to display an icon of main body data.

At step S1402, the data addition unit 1210 determines whether there is any instruction to move the icon associated with the main body data based on a monitoring result of the input processing unit 1212 that monitors user's instruction input via the input device 1101. If the data addition unit 1210 determines that there is the icon movement instruction (YES in step S1402), the processing flow proceeds to step S1403. If the data addition unit 1210 determines that there is not any icon movement instruction (NO in step S1402), the data addition unit 1210 repeats the processing of step S1402.

At step S1403, the data addition unit 1210 determines whether the icon move destination is a metadata area. If the data addition unit 1210 determines that the destination of the moved icon is a metadata area (YES in step S1403), the processing flow proceeds to step S1404. If the icon move destination is not a metadata area (NO in step S1403), the data addition unit 1210 terminates the processing of this routine.

At step S1404, the data addition unit 1210 adds the metadata values and the metadata item(s) defining a unique area to which the position of the icon having moved onto the metadata area belongs, as metadata, to the main body data associated with the icon.

Figure 16:
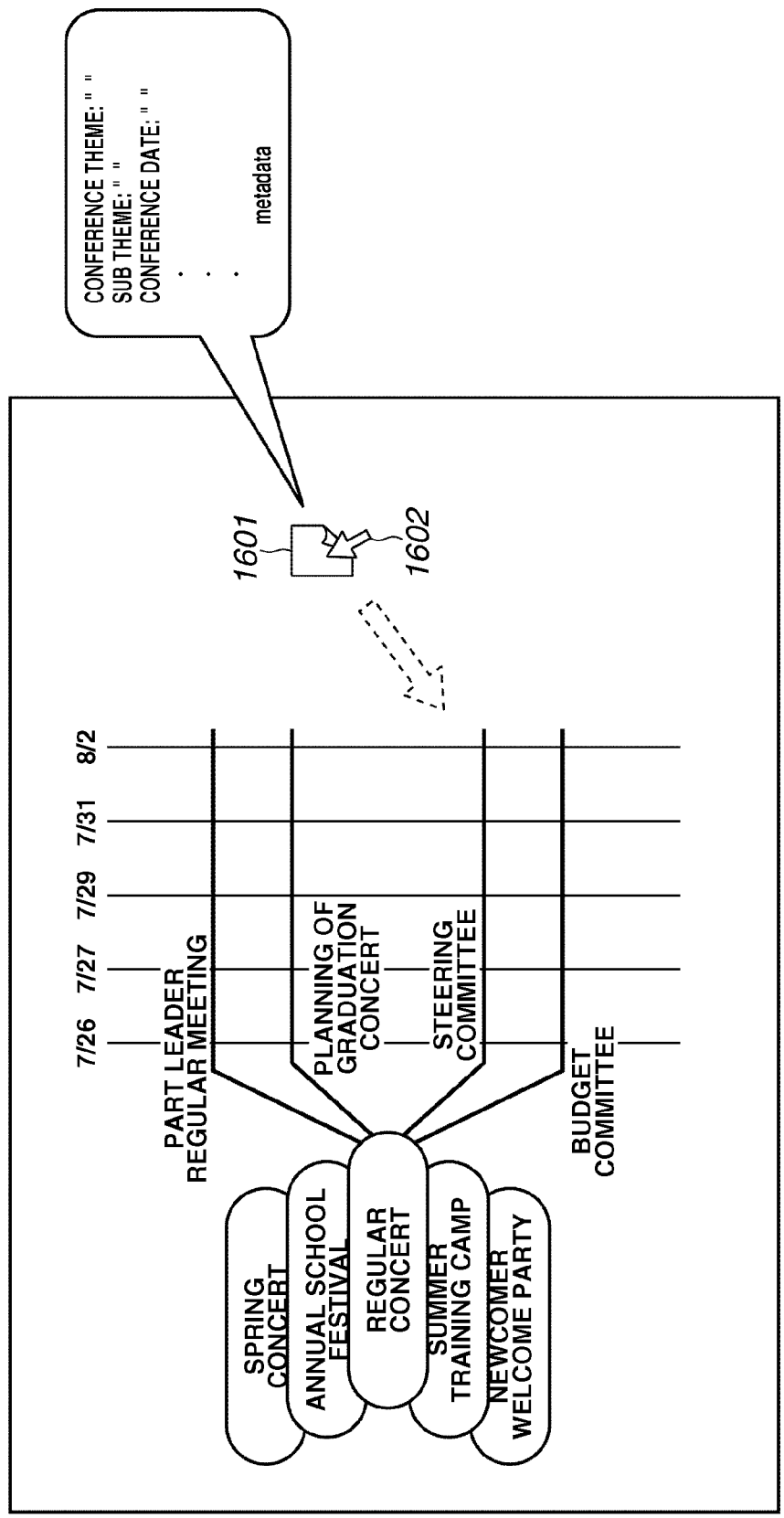
FIG. 16 illustrates an example state where an icon associated with main body data is displayed on a display device and a user selects the icon via an input device to move the icon.
Figure 17:
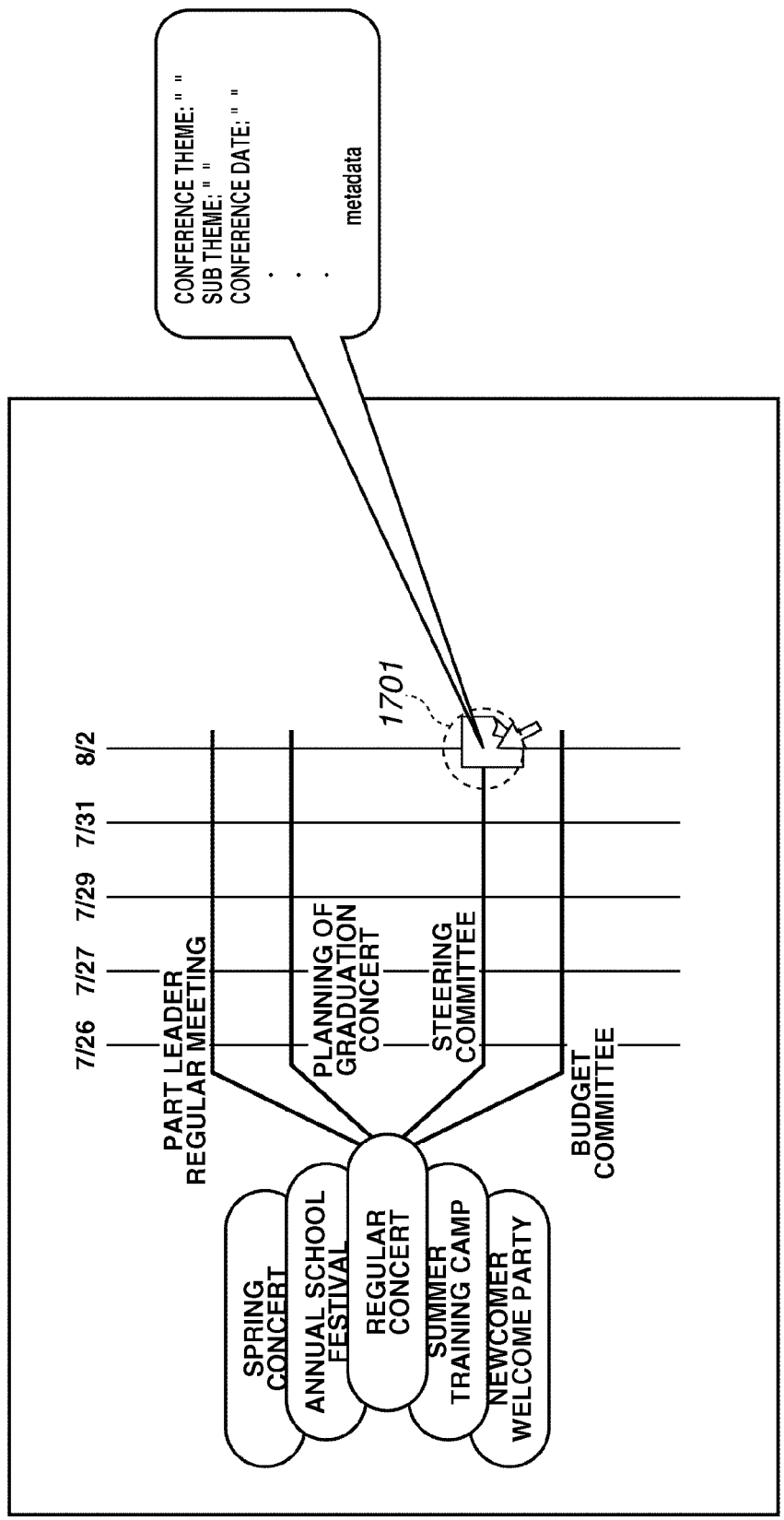
FIG. 17 illustrates an example display of the metadata area including the icon selected and moved by a user
Figure 18:
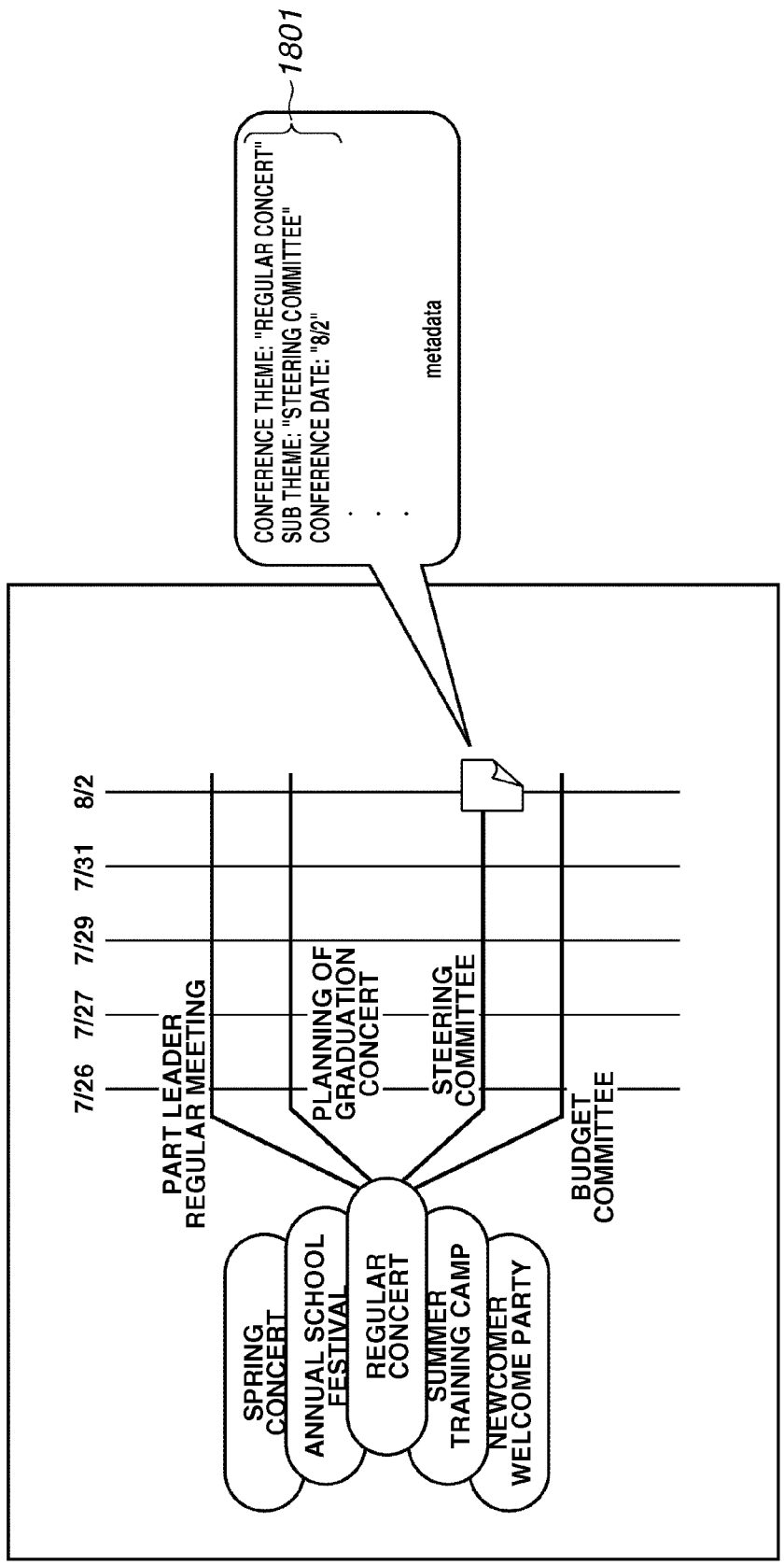
FIG. 18 illustrates an example display of the metadata added to the main body data associated with the icon, according to a finalized destination of the moved icon (i.e., position on the metadata area).

FIGS. 16 to 18 illustrate example display results corresponding to the data adding processing illustrated in FIG. 14, which can be displayed on the display device 1106.

FIG. 16 illustrates an example state (corresponding to step S1401) where an icon 1601 associated with the main body data is displayed on the display device 1106 and a user selects the icon 1601 with a pointer 1602 which can be operated via the input device 1101 (e.g., a pointing device such as a mouse or a pen) to move the icon 1601.

FIG. 17 illustrates an example state of the icon having moved onto the displayed metadata area selected and instructed by a user (FIG. 16).

The position of the moved icon is a crossing point 1701 of two unique areas. One is a unique area defined by the metadata value "regular concert" of the metadata item "conference theme" and also defined by the metadata value "steering committee" of the metadata item "sub theme." The other is an area defined by the metadata value "8/2" of the metadata item "conference date."

FIG. 18 illustrates an example display of metadata 1801 added to the main body data associated with the icon, according to a finalized destination of the moved icon (i.e., position on the metadata area). More specifically, the "regular concert" is added as corresponding metadata value to the metadata item "conference theme." The "steering committee" is added as corresponding metadata value to the metadata item "sub theme." Furthermore, the date "8/2" is added as corresponding metadata value to the metadata item "conference date."

The present invention is not limited to the above-described exemplary embodiment which moves an icon to a crossing point where two unique areas cross each other. An exemplary embodiment can move an icon to a position on a metadata area where unique areas do not cross each other if adding metadata value(s) and metadata item(s) defining only one unique area is desired.

According to the example illustrated in FIG. 18, an unique area defined by the metadata value "8/2" of the metadata item "conference date" can be moved to a place where the unique areas defined by the metadata items "conference theme" and "sub theme" do not cross each other. Thus, only the metadata value "8/2" can be added to the metadata item "conference date."

The example illustrated in FIG. 18 employs a display format of "8/2" that expresses the metadata value corresponding to the metadata item "conference date." It is desirable to use a uniform format for a value actually added as metadata.

An exemplary embodiment adds the metadata value "8/2" after completing conversion into another format without directly adding the metadata value according to the display on the metadata area. Another format is, for example, "August, 2" or "2006.8.2."

As apparent from the foregoing description, the information processing apparatus according to an exemplary embodiment displays a metadata area on a display device and, if a user moves an icon onto the metadata area, can add metadata to main body data associated with the icon.

As a result, the operation for adding metadata to main body data becomes simple. Thus, the work load of a user who adds metadata to main body data can be reduced.

Sixth Exemplary Embodiment

The present invention is not limited to the above-described fifth exemplary embodiment which enables a user to move an icon to a unique area defined by metadata value(s) and metadata item(s) to add the metadata value(s) and the metadata item(s) defining the unique area as metadata to main body data associated with the icon.

For example, an exemplary embodiment can make a group of unique areas displayed at mutually spaced positions and enables a user to move an icon onto an area surrounding the grouped unique areas to add all metadata values and metadata items defining the surrounded unique area.

Figure 19:
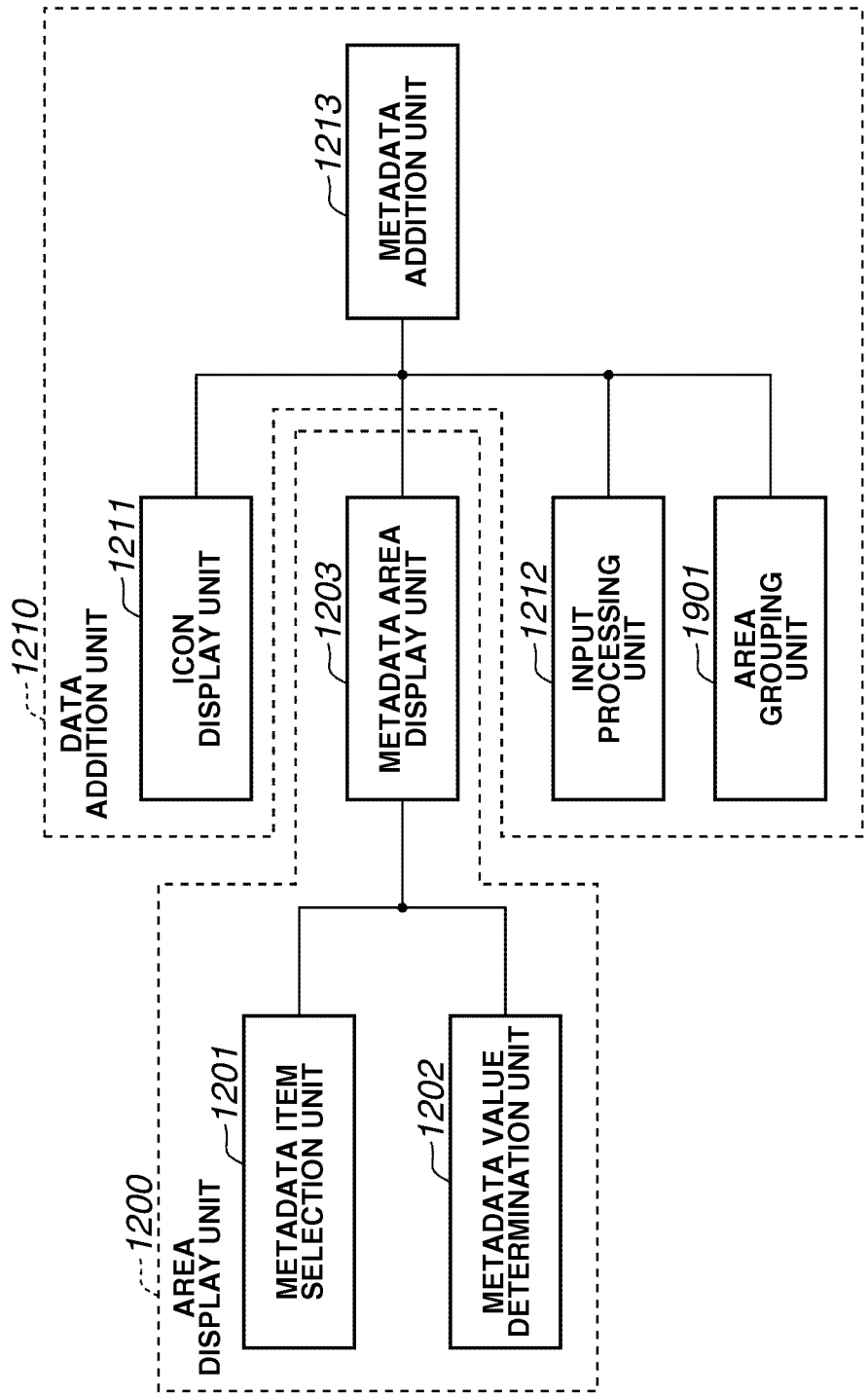
FIG. 19 is a functional block diagram illustrating an information processing apparatus that can realize a metadata adding function.

FIG. 19 is a functional block diagram illustrating an information processing apparatus that can realize a metadata adding function according to an exemplary embodiment.

The functional block diagram illustrated in FIG. 19 differs from the functional block diagram of the above-described fifth exemplary embodiment illustrated in FIG. 12 in that the data addition unit 1210 additionally includes an area grouping unit 1901.

The area grouping unit 1901 performs processing for grouping a plurality of unique areas in a metadata area based on a grouping instruction instructed via the input processing unit 1212. More specifically, the area grouping unit 1901 recognizes a plurality of surrounded unique areas in a metadata area as the same group area. If a user moves an icon into the group area surrounding the plurality of unique areas, the area grouping unit 1901 adds metadata values and metadata items defining all unique areas involved in the group area to main body data.

Figure 20:
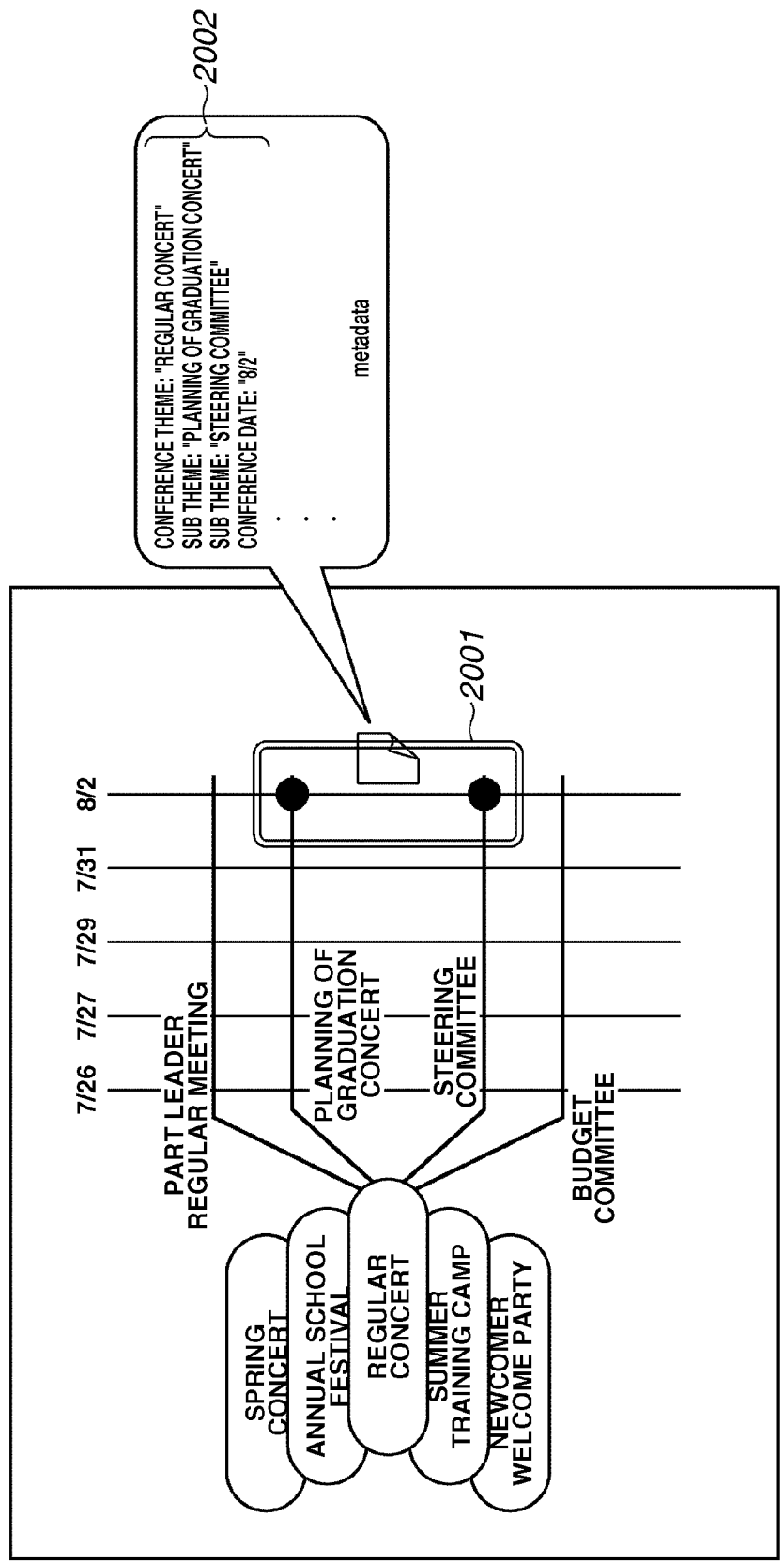
FIG. 20 illustrates example metadata added to main body data as a result of grouping processing performed by an area grouping unit.

FIG. 20 illustrates example metadata added to main body data as a result of the grouping processing performed by the area grouping unit 1901.

The example illustrated in FIG. 20 is a grouping of two unique areas defined by the metadata value "2006.8.2" of the metadata item "conference date", i.e., part of the unique areas defined by the metadata value "regular concert" of the metadata item "conference theme."

More specifically, one of the grouped unique areas is a unique area defined by the metadata value "planning of graduation concert" of the metadata item "sub theme" and the other is a unique area defined by the metadata value "steering committee" of the metadata item "sub theme."

If a user moves an icon into a group area 2001 and fixes its position, the metadata values and the metadata items (2002) defining the above-described two unique areas can be added together to the main body data as illustrated in FIG. 20.

The method for displaying a group area is not limited to the example illustrated in FIG. 20 which displays doubled lines indicating a group area surrounding the grouped unique areas. Any other method capable of explicitly displaying grouped unique areas can be used.

As apparent from the foregoing description, an exemplary embodiment can realize a grouping of a plurality of unique areas in a metadata area and can add all metadata values and metadata items defining a plurality of unique areas which do not cross each other to main body data. As a result, the operation for adding many metadata to main body data becomes simple.

Seventh Exemplary Embodiment

The present invention is not limited to the above-described fifth and sixth exemplary embodiments which provides a grouping function for increasing the number of metadata addable by one operation, improving user's operability, and reducing the work load of a user. For example, if there is any main body data to which metadata have been already added, the addition-processed metadata can be reused to reduce the work load in a metadata adding operation.

Figure 21:
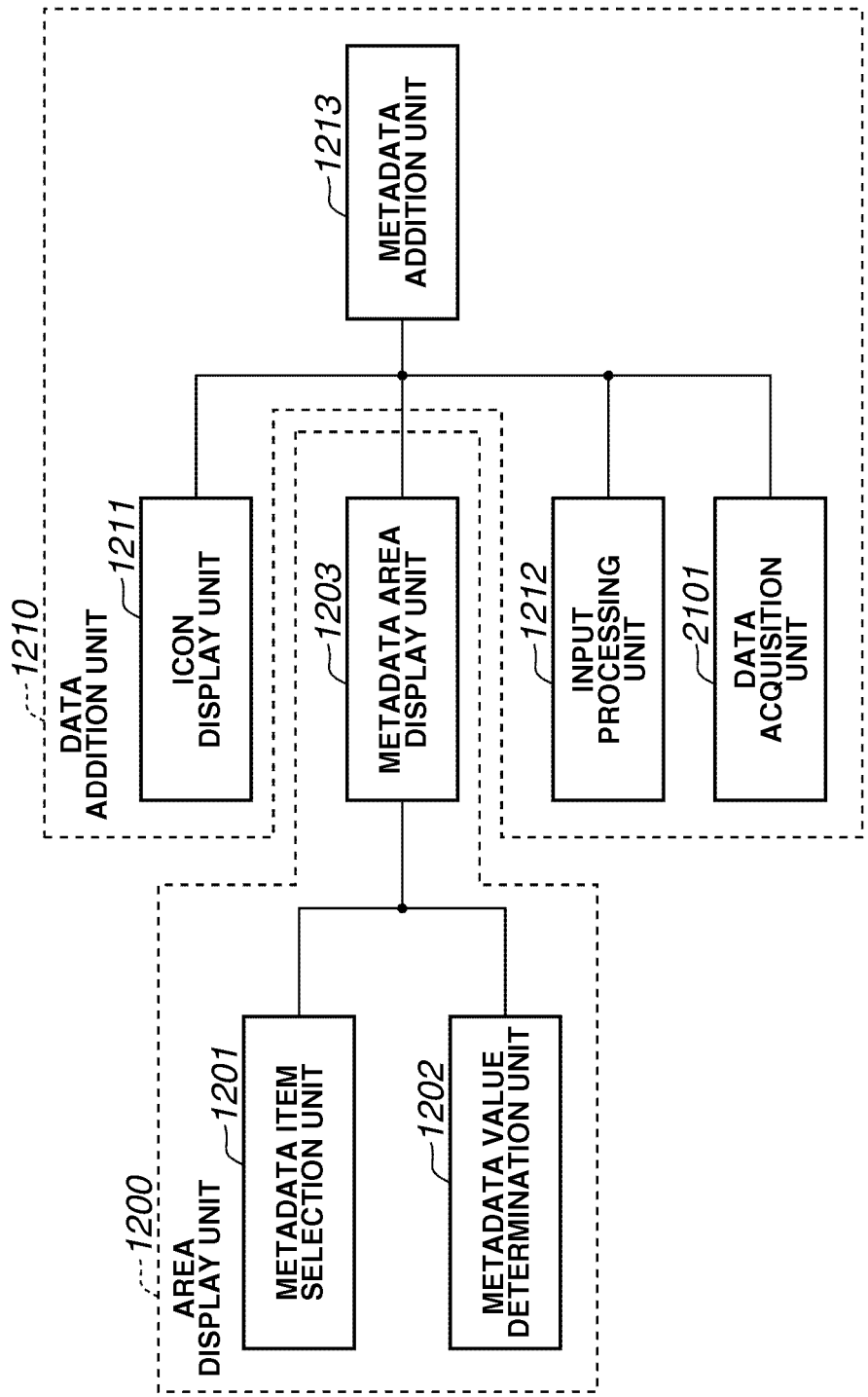
FIG. 21 is a functional block diagram illustrating an information processing apparatus that can realize a metadata adding function.

FIG. 21 is a functional block diagram illustrating an information processing apparatus that can realize a metadata adding function according to an exemplary embodiment.

The functional block diagram illustrated in FIG. 21 differs from the functional block diagram of the above-described fifth exemplary embodiment illustrated in FIG. 19 in that the data addition unit 1210 additionally includes a data acquisition unit 2101.

The data acquisition unit 2101 acquires, from the storage device 1103, any main body data to which value(s) and item(s) identical to the metadata value(s) and metadata item(s) defining unique area(s) in a metadata area displayed on the display device 1106 are already added. The display device 1106 displays metadata added to the acquired main body data as identifier for each main body data.

In this case, if a user moves an icon onto the metadata area, the metadata addition unit 1213 adds metadata value(s) and metadata item(s) defining a unique area in the metadata area. Furthermore, the metadata addition unit 1213 adds the metadata added to the main body data displayed by the data acquisition unit 2101.

FIGS. 22 to 24 illustrate example display results corresponding to the data adding processing according to an exemplary embodiment. The present invention does not limit a method for displaying a metadata area. The following embodiment employs a display example different from that described in the above-described fifth and sixth exemplary embodiments. However, it is needless to say that the display example illustrated in the above-described fifth and sixth exemplary embodiments can be processed similarly in each of the following exemplary embodiments. Furthermore, it is needless to say that a display example in each of the following exemplary embodiments can realize the processing described in the above-described fifth and sixth exemplary embodiments.

FIG. 22 illustrates a display example of the metadata area according to which "event name" and "year of photo, month of photo" are selected as metadata items. Metadata values 2201 corresponding to the metadata item "event name" are "sports day", "back to hometown", "Taro's birthday", "Hanako's birthday", and "Christmas." Furthermore, metadata values 2202 corresponding to the metadata item "year of photo, month of photo" are "year 2006" and "January" through "December."

The metadata values 2201 corresponding to the metadata item "event name" are arrayed in the vertical direction. The metadata values 2202 corresponding to the metadata item "year of photo, month of photo" are arrayed in the horizontal direction. Considering an available display area for the metadata item "year of photo, month of photo", the display of the metadata values 2202 is limited to "July" through "December."

Furthermore, the display example illustrated in FIG. 22 displays a black circular mark (identifier) indicating other main body data including the above-described metadata item(s) and metadata values acquired by the storage device 1103. For example, a black circular mark 2203 indicates main body data including the metadata item "event name" and its metadata value "sports day" as well as the metadata item "year of photo, month of photo" and its metadata values "year 2006" and "October."

The main body data indicated by the black circular mark 2203 include a metadata value "○△ elementary school" of a metadata item "place" and a metadata value "Taro" of a metadata item "participant" (2204) in addition to the above-described metadata.

FIG. 23 illustrates an example icon 2301 associated with main body data (an object to which metadata can be added) displayed on the display device 1106, in a state where the metadata area illustrated in FIG. 22 is displayed. In this embodiment, the main body data associated with the icon 2301 is electronic data to which metadata is not added. However, an exemplary embodiment can be applied to a case where metadata added to main body data is changed.

FIG. 24 illustrates the icon 2301 moving along the metadata area on which the black circular mark 2203 is displayed.

FIG. 25 illustrates the icon 2301 having reached the position of the black circular mark 2203 on the metadata area.

As illustrated in FIG. 25, if a user moves the icon 2301 to a position of the displayed black circular mark 2203 on the metadata area, metadata value(s) and metadata item(s) defining a unique area in the metadata area can be added as metadata.

More specifically, the metadata item "event name" and its metadata value "sports day" and the metadata item "year of photo, month of photo" and its metadata values "year 2006" and "October" are added to the main body data associated with the icon 2301.

Furthermore, other metadata added to the main body data indicated by the black circular mark 2203 are also added to the main body data associated with the icon 2301.

More specifically, the metadata item "place" and its metadata value "○△ elementary school" as well as the metadata item "participant" and its metadata value "Taro" are added to the main body data associated with the icon 2301 (refer to 2501).

As apparent from the foregoing description, an exemplary embodiment includes a data acquisition unit configured to acquire, from a storage device, other main body data to which metadata value(s) and metadata item(s) defining a unique area in a displayed metadata area are already added and a main body data display unit configured to display its identifier.

Accordingly, in addition to the metadata value(s) and metadata item(s) defining the unique area, any metadata added to the main body data displayed in the metadata area can be added if a user moves an icon to a position on the metadata area.

As a result, the operation for adding many metadata to main body data becomes simple. Thus, the work load of a user who adds metadata to main body data can be reduced.

The metadata adding function according to an exemplary embodiment is effective for an information processing apparatus that has an image data registration function (e.g., an electronic album) and displays image data having been rearranged and classified according to metadata.

In a state where image data is already associated with metadata, a user may capture an image of the same object and newly register the image data into an electronic album. In such a case, the metadata adding function according to an exemplary embodiment can add, to the newly registered image data, metadata identical to that of the already registered image data.

As described above, the metadata adding function according to an exemplary embodiment can reduce the work load of a user who adds metadata to main body data, for example, in a registration work using an electronic album system and can add metadata identical to the existing one. As a result, fluctuation of metadata can be suppressed and the metadata can be reused easily.

Eighth Exemplary Embodiment

The present invention is not limited to the above-described seventh exemplary embodiment which displays one black circular mark as identifier of a unique area in the metadata area. For example, the data acquisition unit 2101 can acquire, from the storage device 1103, a plurality of identifiers of other main body data to which metadata value(s) and metadata item(s) defining one unique area are already added.

FIG. 26 illustrates a plurality of main body data acquired by the data acquisition unit 2101, together with a plurality of black circular marks displayed at corresponding positions on the metadata area.

As illustrated in FIG. 26, two black circular marks 2601 and 2602 are associated with two main body data which include the metadata item "event name" and its metadata value "sports day" as well as the metadata item "year of photo, month of photo" and its metadata values "year 2006" and "October."

Furthermore, the main body data indicated by the black circular mark 2602 includes the metadata item "place" and its metadata value "□○ kindergarten" as well as the metadata item "participant" and its metadata value "Hanako."

The main body data indicated by the black circular mark 2601 includes the metadata item "place" and its metadata value "○△ elementary school" as well as the metadata item "participant" and its metadata value "Taro."

In this case, if a user moves an icon to a position of the black circular mark 2602 on the metadata area, the metadata value(s) and the metadata item(s) defining a unique area in the metadata area can be added as metadata. Subsequently, the metadata added to the main body data indicated by the black circular mark 2602 can be added.

More specifically, the metadata item "event name" and its metadata value "sports day" as well as the metadata item "year of photo, month of photo" and its metadata values "year 2006" and "October" are added to the main body data associated with the icon. Furthermore, the metadata (i.e., the metadata item "place" and its metadata value "Do kindergarten" as well as the metadata item "participant" and its metadata value "Hanako") added to the main body data indicated by the black circular mark 2602 are added to the main body data associated with the icon.

On the other hand, if a user moves an icon to a position of the black circular mark 2601 on the metadata area, the metadata value(s) and the metadata item(s) defining a unique area in the metadata area can be added as metadata. Subsequently, the metadata added to the main body data indicated by the black circular mark 2601 can be added.

More specifically, the metadata item "event name" and its metadata value "sports day" as well as the metadata item "year of photo, month of photo" and its metadata values "year 2006" and "October" are added to the main body data associated with the icon. Furthermore, the metadata (i.e., the metadata item "place" and its metadata value "○△ elementary school" as well as the metadata item "participant" and its metadata value "Taro") added to the main body data indicated by the black circular mark 2601 are added to the main body data associated with the icon.

As apparent from the foregoing description, an exemplary embodiment acquires a plurality of other main body data to which metadata value(s) and metadata item(s) defining a unique area are already added, from a storage device, and displays a plurality of identifiers of the acquired main body data.

Accordingly, in addition to the metadata value(s) and metadata item(s) defining the unique area, any metadata added to the plurality of main body data displayed on the metadata area can be added if a user moves an icon to a position on the metadata area.

Furthermore, an exemplary embodiment changes metadata added to the icon according to a destination of the moved icon (i.e., the position of one of the identifiers of the plurality of main body data displayed on the metadata area). Thus, a user can easily add desired metadata to main body data.

The present invention is not limited to the above-described display method according to which a plurality of main body data acquired by a data acquisition unit can be displayed as independent black circular marks on a metadata area. For example, an exemplary embodiment integrates common metadata, i.e., part of the metadata added to the acquired plurality of main body data, and displays the integrated common metadata as one black circular mark. In this case, the common metadata added to the plurality of main body data (i.e., part of the metadata added to the acquired plurality of main body data) can be added to the main body data associated with the icon.

Ninth Exemplary Embodiment

The present invention is not limited to the above-described seventh and eighth exemplary embodiments according to which a data acquisition unit acquires, from a storage device, any main body data to which metadata value(s) and metadata item(s) completely identical to the metadata value(s) and metadata item(s) defining a unique area in the metadata area are already added and displays the acquired main body data.

For example, an exemplary embodiment acquires, from a storage device, any metadata added main body data identical in contents but different in display format from the metadata value(s) and metadata item(s) defining a unique area, and displays an identifier of the acquired main body data on the metadata area.

For example, it is now assumed that a metadata item added to main body data already stored in the storage device 1103 is "date of photo" and its metadata value is "2006.12.25" expressed in the form of year, month, and date.

In this case, the data acquisition unit 2101 according to an exemplary embodiment recognizes that the metadata item accords with "year of photo, month of photo" and its metadata value accords with "year 2006" and "December." Thus, the data acquisition unit 2101 acquires this metadata added main body data.

FIG. 27 illustrates an example display of black circular marks indicating main body data acquired by the data acquisition unit 2101 that can recognize an addition of metadata identical to the metadata value(s) and metadata item(s) defining a unique area.

As illustrated in FIG. 27, the main body data indicated by a black circular mark 2703 includes the metadata item "event name" and its metadata value "Christmas" as well as the metadata item "date of photo" and its metadata value "December 24, 2006."

Furthermore, the main body data indicated by a black circular mark 2704 includes the metadata item "event name" and its metadata value "Christmas" as well as the metadata item "date of photo" and its metadata value "December 25, 2006."

In this manner, an exemplary embodiment recognizes the metadata item "year of photo, month of photo" and its metadata value "year 2006, December" are metadata corresponding to the metadata item "date of photo" and its metadata value "December 24, 2006."

Similarly, an exemplary embodiment recognizes the metadata item "year of photo, month of photo" and its metadata value "year 2006, December" are metadata corresponding to the metadata item "date of photo" and its metadata value "December 25, 2006."

In other words, the data acquisition unit 2101 according to an exemplary embodiment stores information indicating that "year" and "month" can be derived from the metadata item "date of photo" or information indicating that "year, month, day" is a display format for a metadata value of the "date of photo."

The above-described processing can be realized by utilizing a relationship between metadata value(s) and metadata item(s) defining a unique area and metadata value(s) and metadata item(s) actually added to main body data or information relating to the display format of their metadata values.

It is desirable to unify the expression of metadata items or unify the display format of metadata values when the metadata added to the main body data acquired in this manner is added to main body data associated with an icon. In view of the reusability of metadata added main body data, it is desirable to reduce the fluctuation of metadata values.

More specifically, if there is not any metadata including metadata items "year" and "month" in the metadata already added to the main body data, an existing metadata item (e.g., "date of photo" according to this example) can be added to the main body data.

As apparent from the foregoing description, a data acquisition unit according to an exemplary embodiment acquires any main body data identical in contents but different in expression method or display format from a storage device.

Thus, a user can add many metadata to main body data associated with an icon.

Tenth Exemplary Embodiment

The present invention is not limited to the above-described fifth through ninth exemplary embodiments which selects predetermined metadata item(s) in the area display processing. For example, the input device 1101 can allow a user to designate a metadata item to be displayed on a metadata area. Furthermore, a user can determine metadata values according to the designated metadata item(s).

In this case, the display of the metadata area is switched. FIG. 28 illustrates an example display of a metadata area switched from the display example of the metadata area illustrated in FIG. 22 in response to a designation of another metadata item "place of photo."

For example, if the designated metadata item is "place of photo", metadata values 2801 corresponding to the designated metadata item are "my home", "elementary school", "father's house", "mother's house", and "kindergarten." The metadata area illustrated in FIG. 28 can be generated and displayed by arraying the determined metadata values in the vertical direction.

In this manner, an exemplary embodiment allows a user to designate any metadata item in the area display processing. Thus, a user can generate a desired metadata area.

For example, the above-described metadata adding function is effective for an information processing apparatus that has a function of registering image data, such as an electronic album, to simultaneously perform an image data registration operation and a metadata adding operation.

Eleventh Exemplary Embodiment

The present invention is not limited to the above-described fifth through tenth exemplary embodiments which display a two-dimensional metadata area. For example, an exemplary embodiment displays a three-dimensional metadata area if there are three metadata items. In this case, if a user moves an icon to an area where three unique areas cross each other, all of metadata values and metadata items defining unique areas included in the metadata area can be added to main body data associated with the icon.

The present invention is not limited to the above-described fifth through tenth exemplary embodiments which enables a user to move an icon to a metadata area displayed on the same screen to simply add metadata. For example, an exemplary embodiment enables a user to perform a predetermined operation to display another metadata area and adds metadata value (s) and metadata item(s) defining a unique area in another metadata area to main body data associated with the icon.

Furthermore, another metadata area is not limited to only one and may include a plurality of areas. An exemplary embodiment enables a user to move the icon to another metadata area to add metadata value(s) and metadata item(s) defining a unique area in another metadata area to main body data associated with the icon.

Other Exemplary Embodiments

The present invention can be applied to a system including a plurality of devices (e.g., a host computer, an interface device, a reader, and a printer) or can be applied to a single apparatus (e.g., a copying machine or a facsimile apparatus).

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. In this case, the type of program can be any one of object code, interpreter program, and OS script data. Furthermore, the present invention encompasses supplying program code to a computer with a storage (or recording) medium storing the program code. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

When the computer reads and executes the installed programs, the functions of the above-described exemplary embodiments can be realized. Moreover, an operating system (OS) or other application software running on a computer can execute part or the whole of actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-082745 filed Mar. 27, 2007 and Japanese Patent Application No. 2007-082746 filed Mar. 27, 2007, which are hereby incorporated by reference herein in their entirety.

What is claimed is:

1. An information processing apparatus comprising:
a processor; and
a memory coupled to the processor storing instructions that, when executed by the processor, cause the processor to perform operations comprising:
displaying a metadata area including metadata values belonging to a first metadata item arrayed in a first direction, metadata values belonging to a second metadata item arrayed in a second direction, unique areas defined along the second direction for respective metadata values arrayed in the first direction, and unique areas defined along the first direction for respective metadata values arrayed in the second direction, such that crossing areas, in the unique areas, formed by lines in the first and second directions indicate corresponding metadata values are added;
displaying an icon associated with main body data and enabling a user to add the metadata;
grouping at least two of the unique areas defined for the respective metadata values arrayed in the first direction or at least two of the unique areas defined for the respective metadata values arrayed in the second direction such that the first and second metadata items corresponding to the at least two grouped unique areas have the same respective metadata values; and
adding the respective metadata values for which the at least two grouped unique areas are defined, as metadata, to main body data associated with the icon, in a case where the displayed icon is moved to either one of the at least two grouped unique areas in the metadata area.

2. The information processing apparatus according to claim 1, wherein the operations comprising adding the respective metadata values comprise adding all of the metadata values defining respective unique areas to the main body data associated with the icon if the position of the displayed icon having been moved onto the metadata area is in an area where a plurality of unique areas defined for respective metadata values cross each other.

3. The information processing apparatus according to claim 1, further comprising
a storage unit coupled to the processor and configured to store metadata added main body data; and
a main body data display unit coupled to the processor and configured to display, on the metadata area, an identifier representing metadata added main body data that includes metadata corresponding to the metadata arrayed in the metadata area, among metadata added to main body data stored in the storage unit.

4. The information processing apparatus according to claim 3, wherein the operations comprising adding the respective metadata values comprise adding data defining the unique area and metadata added to the main body data representing the identifier to the main body data associated with the icon if the position of the displayed icon having been moved onto the metadata area is in the unique area and on the identifier.

5. The information processing apparatus according to claim 3, wherein the main body data display unit displays, on the metadata area, a plurality of the identifiers if there are a plurality of metadata added main body data including metadata items and values corresponding to metadata items and values arrayed on the metadata area, among metadata added to the main body data stored in the storage unit.

6. The information processing apparatus according to claim 5, wherein the main body data display unit displays an identifier integrating a plurality of main body data if there is a plurality of metadata added to the main body data including metadata items and values corresponding to metadata items and values arrayed on the metadata area, among metadata added to the main body data stored in the storage unit, and the operations comprising adding the respective metadata values comprise adding a plurality of metadata items and values added to the plurality of main body data corresponding to the integrated identifier to the main body data associated with the icon if the position of the displayed icon having been moved onto the metadata area is on the integrated identifier.

7. The information processing apparatus according to claim 3, wherein the main body data display unit displays, on the metadata area, an identifier representing metadata added main body data including metadata items and values similar in contents but different in display format from metadata values arrayed in the metadata area, among metadata added to the main body data stored in the storage unit.

8. The information processing apparatus according to claim 1, wherein the operations further comprise enabling a user to designate a metadata item corresponding to metadata values arrayed on the metadata area.

9. A method for an information processing apparatus comprising:

displaying on a display device a metadata area including metadata values belonging to a first metadata item instructed by a user via a pointing device and arrayed in a first direction, metadata values belonging to a second metadata item instructed by the user via the pointing device and arrayed in a second direction, unique areas defined along the second direction for respective metadata values arrayed in the first direction, and unique areas defined along the first direction for respective metadata values arrayed in the second direction, such that crossing areas, in the unique areas, formed by lines in the first and second directions indicate corresponding metadata values are added;

displaying on the display device an icon associated with main body data and enabling a user to add the metadata;

grouping at least two of the unique areas defined for the respective metadata values arrayed in the first direction or at least two of the unique areas defined for the respective metadata values arrayed in the second direction such that the first and second metadata items corresponding to the at least two grouped unique areas have the same respective metadata values; and adding the respective metadata values for which the at least two grouped unique areas are defined, as metadata, to main body data associated with the icon, in a case where the displayed icon is moved to either one of the at least two grouped unique areas in the metadata area.

10. A computer-readable non-transitory storage medium storing a program causing a computer to execute the method according to claim 9.

* * * * *